United States Patent
Bulat-ag

(10) Patent No.: US 10,855,855 B2
(45) Date of Patent: Dec. 1, 2020

(54) IMAGE PROCESSING APPARATUS ELIMINATING REDUNDANCY IN SCANNED TEXT DATA

(71) Applicant: Kyocera Document Solutions Inc., Osaka (JP)

(72) Inventor: Peter James Bulat-ag, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/393,983

(22) Filed: Apr. 25, 2019

(65) Prior Publication Data

US 2019/0349490 A1    Nov. 14, 2019

(30) Foreign Application Priority Data

May 8, 2018   (JP) .................................. 2018-090057

(51) Int. Cl.
  *H04N 1/00*   (2006.01)
  *H04N 1/23*   (2006.01)
  *G06F 3/0488*  (2013.01)

(52) U.S. Cl.
  CPC ..... *H04N 1/00411* (2013.01); *G06F 3/04883* (2013.01); *H04N 1/00803* (2013.01); *H04N 1/00824* (2013.01); *H04N 1/233* (2013.01); *H04N 1/00331* (2013.01)

(58) Field of Classification Search
  CPC .................................................. H04N 1/00331
  See application file for complete search history.

(56) References Cited

U.S. PATENT DOCUMENTS

| | | | | |
|---|---|---|---|---|
| 5,675,672 A | * | 10/1997 | Nakabayashi | G06K 9/22 358/450 |
| 2001/0019636 A1 | * | 9/2001 | Slatter | G06K 9/20 382/284 |
| 2004/0169366 A1 | * | 9/2004 | Duffell | H04N 1/32133 283/17 |
| 2007/0013967 A1 | * | 1/2007 | Ebaugh | G06Q 10/10 358/448 |
| 2010/0305941 A1 | * | 12/2010 | Hogan | G06F 40/20 704/9 |
| 2010/0305977 A1 | * | 12/2010 | Hogan | G06Q 10/10 705/4 |

(Continued)

FOREIGN PATENT DOCUMENTS

| | | |
|---|---|---|
| JP | 2006-195575 A | 7/2006 |
| JP | 2006-196976 A | 7/2006 |

*Primary Examiner* — Nicholas Pachol
(74) *Attorney, Agent, or Firm* — James Judge

(57) ABSTRACT

An image processing apparatus includes an image reading unit and a controller. The image reading unit reads an image on a document to create image data. The controller executes a character conversion process on the image data created by the image reading unit to extract information on a character string included in the image and creates first document data corresponding to the extracted character string based on the extracted information on the character string. When the character string successively includes a first character string and at least one second character string identical to the first character string, the controller creates second document data where document data corresponding to the second character string has been deleted from the first document data using the first document data.

6 Claims, 17 Drawing Sheets

(56) References Cited

U.S. PATENT DOCUMENTS

| | | | |
|---|---|---|---|
| 2011/0258537 A1* | 10/2011 | Rives | G06F 3/04883 |
| | | | 715/255 |
| 2011/0268268 A1* | 11/2011 | Gavrilenco | G06F 21/10 |
| | | | 380/37 |
| 2013/0103773 A1* | 4/2013 | Tsukidate | H04L 51/12 |
| | | | 709/206 |
| 2015/0220490 A1* | 8/2015 | Barber | G06F 40/14 |
| | | | 715/234 |
| 2017/0337184 A1* | 11/2017 | Quah | H04L 51/16 |
| 2018/0137349 A1* | 5/2018 | Such | G06K 9/6273 |

* cited by examiner

IMAGE PROCESSING APPARATUS ELIMINATING REDUNDANCY IN SCANNED TEXT DATA

INCORPORATION BY REFERENCE

This application is based upon, and claims the benefit of priority from, corresponding Japanese Patent Application No. 2018-090057 filed in the Japan Patent Office on May 8, 2018, the entire contents of which are incorporated herein by reference.

BACKGROUND

Unless otherwise indicated herein, the description in this section is not prior art to the claims in this application and is not admitted to be prior art by inclusion in this section.

There has been known a technique that detects text data indicative of a file name and information on a character string in document data or similar data created by an Optical Character Recognition (OCR) function to use the detection results.

For example, when a plurality of pieces of information formed of character strings are displayed in a list, there has been proposed a technique that compares reference information with comparison target information among the plurality of pieces of information based on preset comparison conditions, and the technique emphasizes and displays a part different between the reference information and the comparison target information based on the comparison results.

There has been also proposed a technique with a handwriting document correction mode that corrects content of a character string in a document based on an output result of an OCR process by scanning the document and an output result of an OCR process of only a corrected part by scanning a document corrected by handwriting by a user.

SUMMARY

An image processing apparatus according to an aspect of the disclosure includes an image reading unit and a controller. The image reading unit reads an image on a document to create image data. The controller executes a character conversion process on the image data created by the image reading unit to extract information on a character string included in the image and creates first document data corresponding to the extracted character string based on the extracted information on the character string. When the character string successively includes a first character string and at least one second character string identical to the first character string, the controller creates second document data where document data corresponding to the second character string has been deleted from the first document data using the first document data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
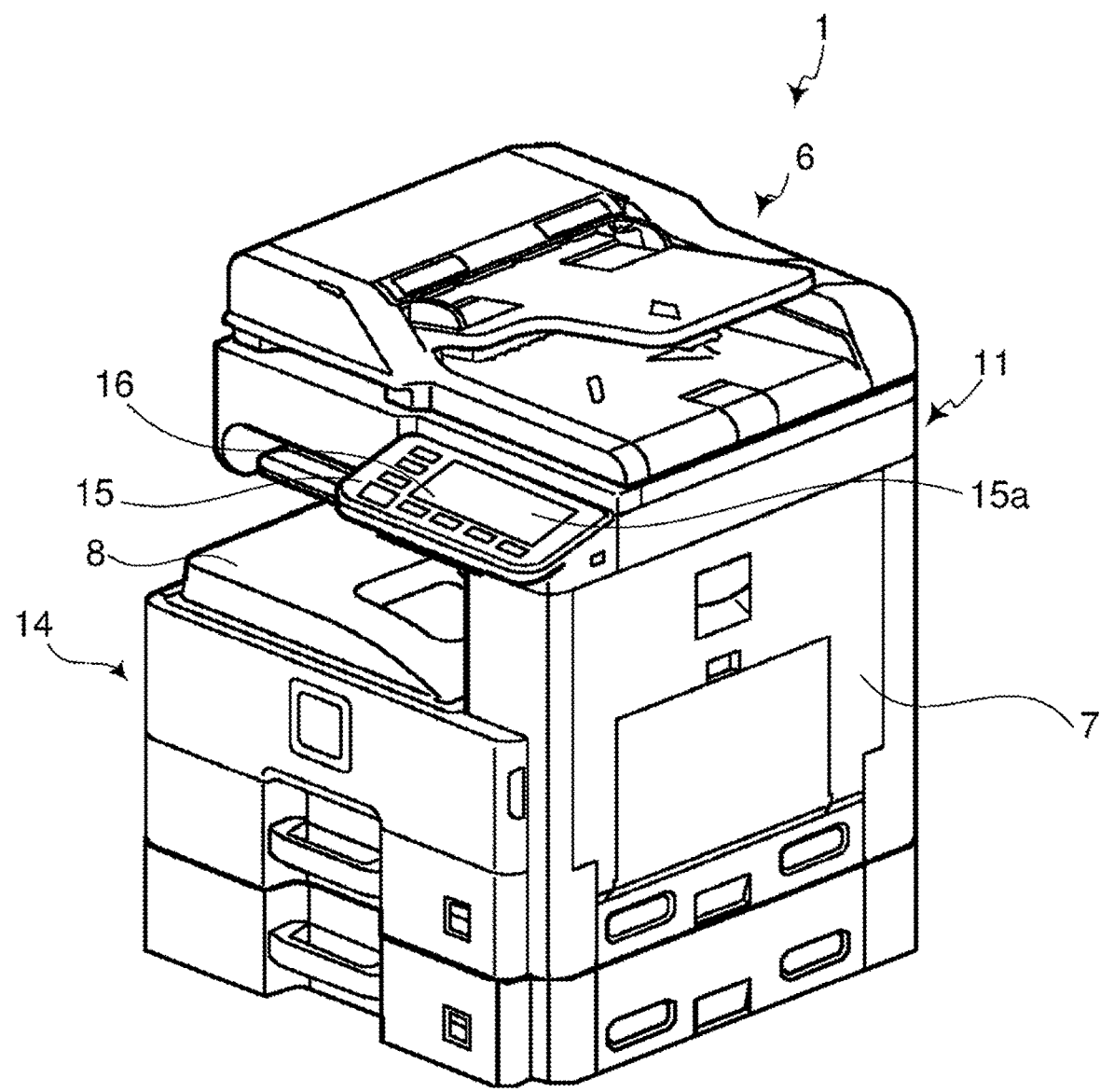
FIG. 1 obliquely illustrates an external appearance of an image forming apparatus including an image processing apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image forming apparatus according to one embodiment of the disclosure with reference to the drawings. FIG. 1 obliquely illustrates an external appearance of an image forming apparatus including an image processing apparatus according to one embodiment of the disclosure.

An image forming apparatus 1 is a multi-functional peripheral having a plurality of functions such as a facsimile function, a copy function, a printer function, and a scanner function. The image forming apparatus 1 of the embodiment has a function to execute a process (hereinafter referred to as "duplication deletion process") that deletes a duplicated character string when this duplicated character string is included in an image on a document as a print target.

In the embodiment, the character string is formed of, for example, a word, a segment, or a composition. The word includes a noun, a verb, and the like formed of a plurality of characters such as "dog," and an article formed of one character such as "a." The character string may be formed of a plurality of words, a plurality of segments, or a plurality of compositions.

The above-described duplicated character strings mean successively arrayed identical character strings. Hereinafter, among the successively arrayed identical character strings, a character string located first is referred to as "first character string," and a character string other than the first character string is referred to as "second character string."

With reference to FIG. 1, a housing 7 of the image forming apparatus 1 houses a plurality of devices to achieve the various functions of the image forming apparatus 1. The housing 7 houses, for example, an image reading unit 11, an image forming unit 12 (not illustrated in FIG. 1), a fixing unit 13 (not illustrated in FIG. 1), and a paper sheet feeder 14.

The image reading unit 11 is an Auto Document Feeder (ADF) that includes a document conveying unit 6 that conveys the document and a scanner that optically reads the document conveyed by the document conveying unit 6 or the document placed on a contact glass (not illustrated). The image reading unit 11 irradiates the document by a light irradiating unit and receives its reflected light by a Charge-Coupled Device (CCD) sensor to read an image on the document and create image data.

The image forming unit 12 includes a photoreceptor drum, a charging apparatus, an exposure apparatus, a developing device, and a transfer apparatus. The image forming unit 12 forms a toner image on a recording sheet supplied from the paper sheet feeder 14 based on the image data created by the image reading unit 11 or the image data transmitted from a personal computer, another facsimile device, or similar device connected via a network.

The fixing unit 13 heats and pressurizes the recording sheet where the toner image is formed on the surface by an image formation process by the image forming unit 12 to fix the toner image to the recording sheet. After the fixation by the fixing unit 13, the recording sheet on which the image is formed is discharged to a sheet discharge tray 8.

The paper sheet feeder 14 pulls out the recording sheet housed in a paper sheet cassette or the recording sheet placed on a manual bypass tray one by one by a pickup roller (not illustrated) to send the recording sheet to the image forming unit 12.

The image forming apparatus 1 includes an operation unit 15 near the image reading unit 11 and on the front side of the image forming apparatus 1. A user inputs, for example, instructions on the various functions executable by the image forming apparatus 1 via the operation unit 15. The operation unit 15 includes a display 16. The display 16 is a display apparatus including a liquid crystal display. The display 16 displays various screens regarding the various functions executable by the image forming apparatus 1. The operation unit 15 includes a touch panel 15a arranged to be overlapped on the display 16. The touch panel 15a senses the user's operation by various operation methods such as a tap operation, a swipe operation, and a flick operation.

Figure 2:
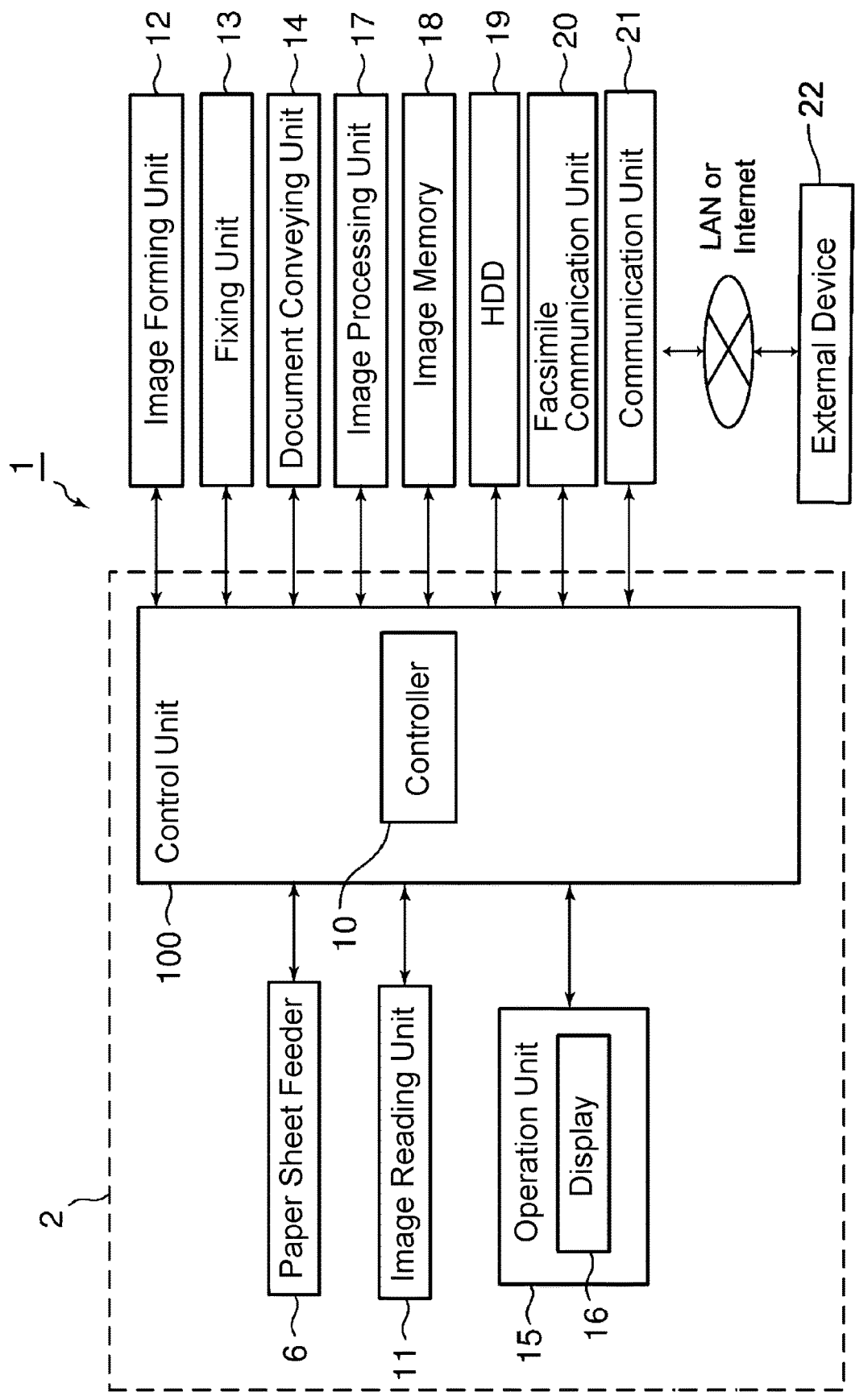
FIG. 2 is a block diagram illustrating an internal configuration of the image forming apparatus including the image processing apparatus according to the one embodiment.

FIG. 2 is a block diagram illustrating an internal configuration of the image forming apparatus including the image processing apparatus according to the one embodiment of the disclosure. With reference to FIG. 2, the image forming apparatus 1 includes a control unit 100. The control unit 100 includes a processor, a Random Access Memory (RAM), a Read Only Memory (ROM), and similar memory. The processor is, for example, a Central Processing Unit (CPU), a Micro Processing Unit (MPU), or an Application Specific Integrated Circuit (ASIC). Through execution of a control program stored in a built-in ROM or HDD 19 by the above-described processor, the control unit 100 functions as a controller 10.

The control unit 100 is electrically connected to the document conveying unit 6, the image reading unit 11, the image forming unit 12, the fixing unit 13, the paper sheet feeder 14, the operation unit 15, an image processing unit 17, an image memory 18, the Hard Disk Drive (HDD) 19, a facsimile communication unit 20, a communication unit 21, and similar unit. In the embodiment, the document conveying unit 6, the image reading unit 11, the operation unit 15, the display 16, and the control unit 100 function as an image processing apparatus 2 to achieve the duplication deletion process.

The control unit 100 is in charge of the whole control of the image forming apparatus 1. More specifically, the control unit 100 executes behaviors of the respective units in the image forming apparatus 1 and a process such as communications with an external device such as a personal computer connected via the network.

The image processing unit 17 executes an image process as necessary on the image data created by the image reading unit 11.

The image memory 18 includes an area to temporarily store the image data as the print target created by the image reading unit 11.

The HDD 19 is a large-capacity storage device that stores various kinds of data including data such as the image data created by the image reading unit 11. The HDD 19 stores various computer programs to achieve the general behaviors of the image forming apparatus 1.

In the embodiment, the control unit 100 has a function that executes a character conversion process on the image data created by the image reading unit 11, extracts information on the character string included in the image, and creates document data corresponding to the extracted character string based on this extracted information on the character string. Accordingly, the HDD 19 stores the computer program to execute an OCR process, one of the character conversion processes. The processor behaves in accordance with this computer program and executes the OCR process that converts a part recognized as a character in the image data into the document data as the controller 10.

The HDD 19 stores a first control program to execute a first duplication deletion process and a second control program to execute a second duplication deletion process according to the embodiment. The processor behaves in accordance with the first control program and the second control program to execute the first duplication deletion process and the second duplication deletion process according to the embodiment as the controller 10. The first duplication deletion process and the second duplication deletion process may be configured to be operable by a hardware circuit not by the behavior based on the computer program.

The facsimile communication unit 20 connects to a public line and transmits and receives the image data via the public line.

The communication unit 21 includes a communication module such as a LAN board. The image forming apparatus 1 executes data communications with an external device 22 such as the personal computer on the network via the communication unit 21.

To the respective units in the image forming apparatus 1, a power supply (not illustrated) is connected, and supplying electric power from this power supply operates the respective units in the image forming apparatus 1.

Behaviors

Figure 3:
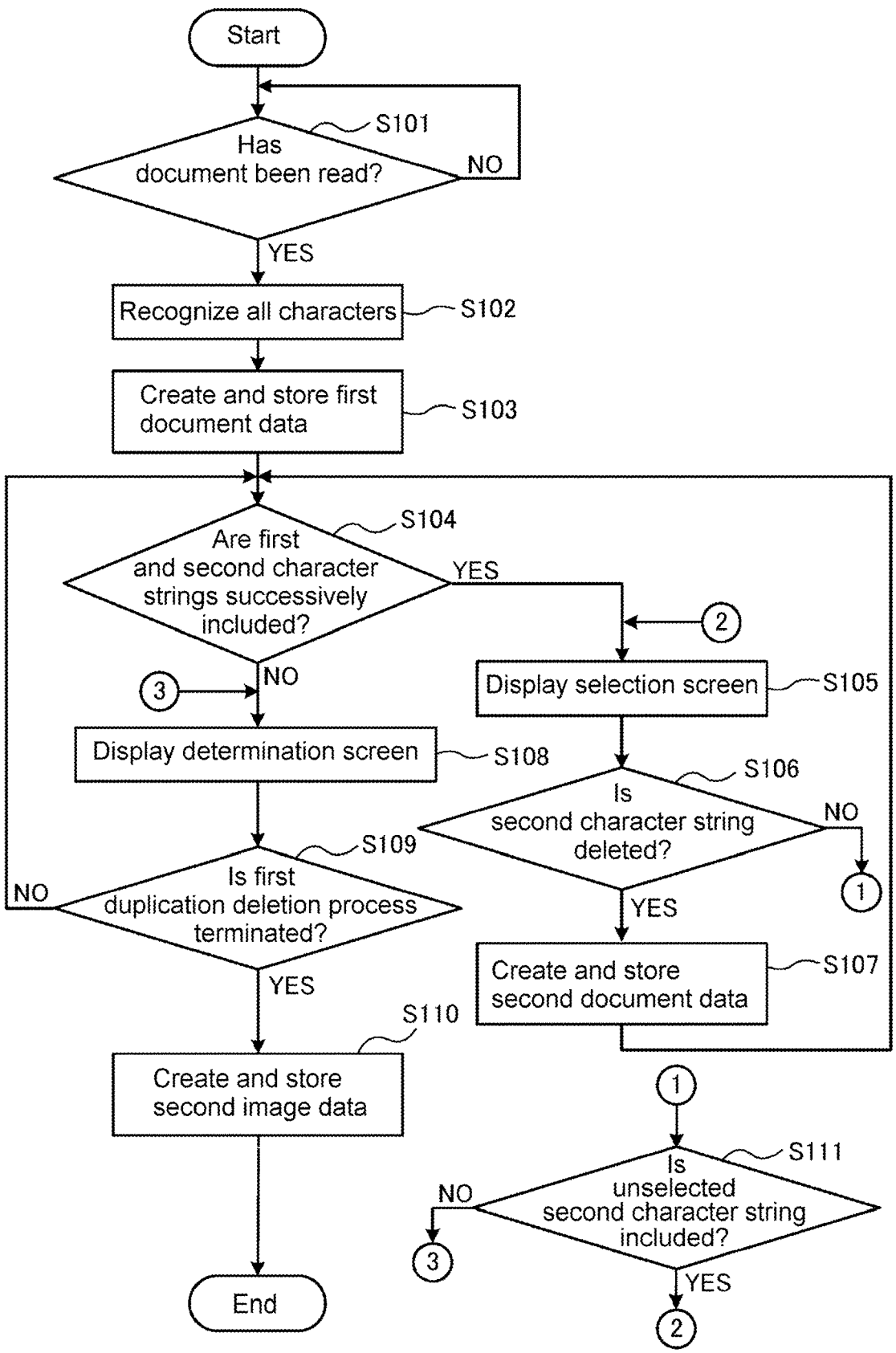
FIG. 3 illustrates a first duplication deletion process according to the one embodiment.
Figure 4:
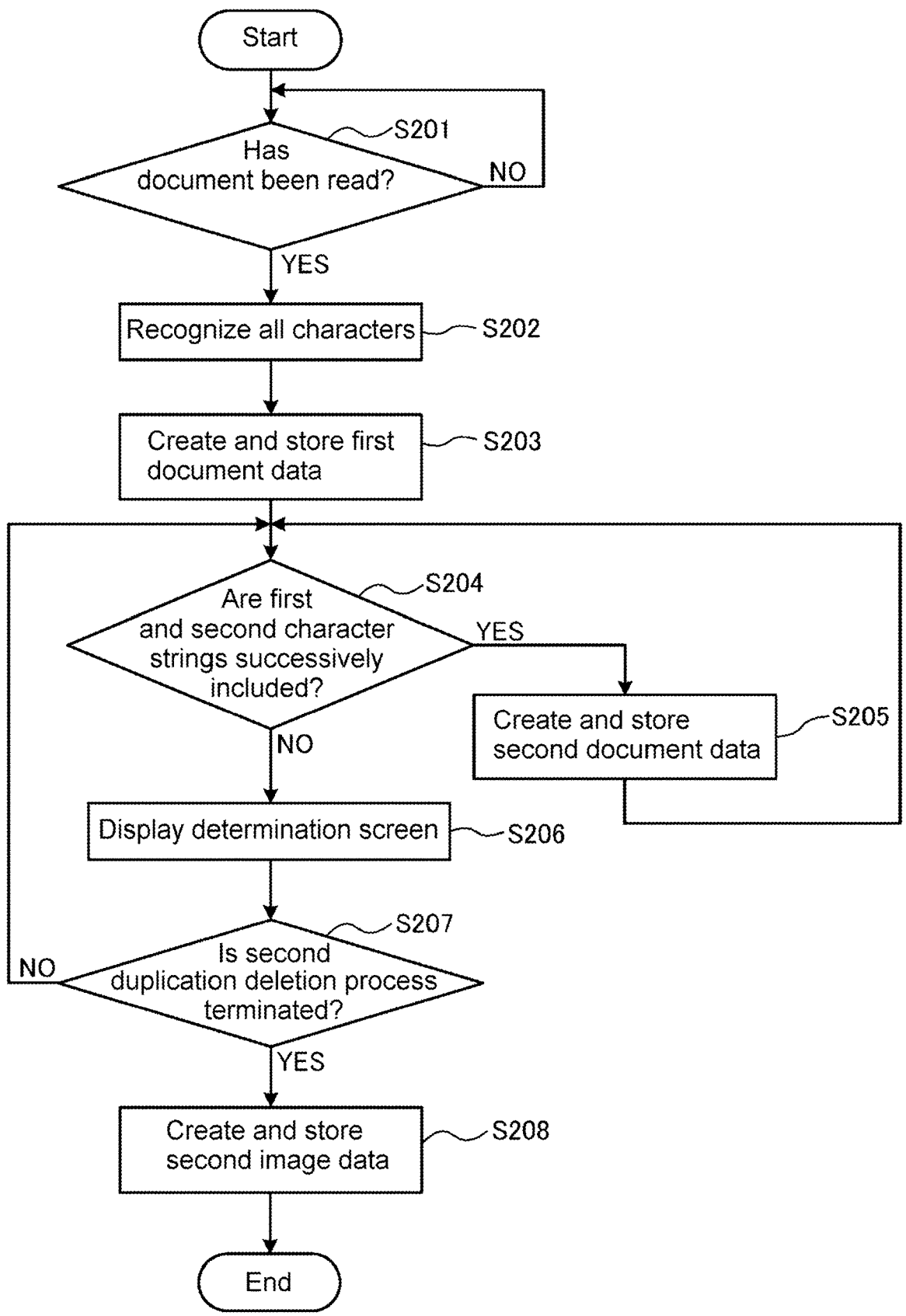
FIG. 4 illustrates a second duplication deletion process according to the one embodiment.

FIG. 3 illustrates the first duplication deletion process. FIG. 4 illustrates the second duplication deletion process. The following describes control structures of the first control program to execute the first duplication deletion process and the second control program to execute the second duplication deletion process together with the behaviors of the image forming apparatus 1.

The first control program is executed by configuring a setting of a function (hereinafter referred to as "duplication deletion function") that deletes the duplicated character string such that the duplicated character string is deleted according to an instruction from the user by the input via the operation unit 15 by the user. The second control program is executed by configuring the setting of the duplication deletion function such that the duplicated character string is deleted not by the instruction from the user by the input via the operation unit 15 by the user.

Figure 5:
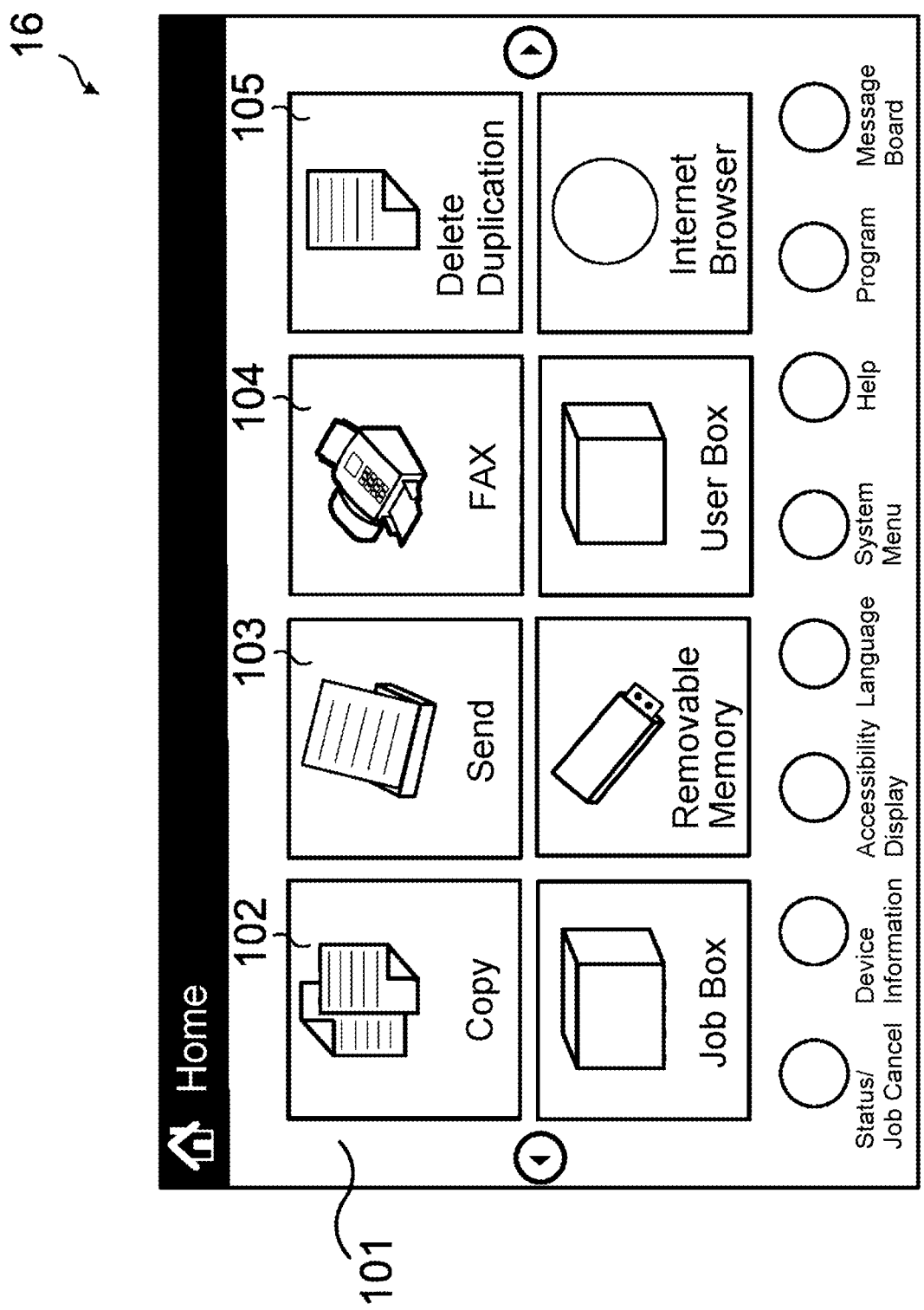
FIG. 5 illustrates one example of a home screen.

When the power supply of the image forming apparatus 1 is turned on, the controller 10 causes the display 16 to display a home screen to select any of the plurality of functions executable by the image forming apparatus 1. FIG. 5 illustrates one example of the home screen. With reference to FIG. 5, a home screen 101 includes a key 102 to select the copy function, a key 103 to select the scanner function, a key 104 to select the facsimile function, a key 105 to select the duplication deletion function, and similar key as software keys.

When the user presses the key 105 to select the duplication deletion function, the controller 10 accepts this selection via the touch panel 15*a* and causes the display 16 to display a setting screen to set the duplication deletion function.

Figure 6:
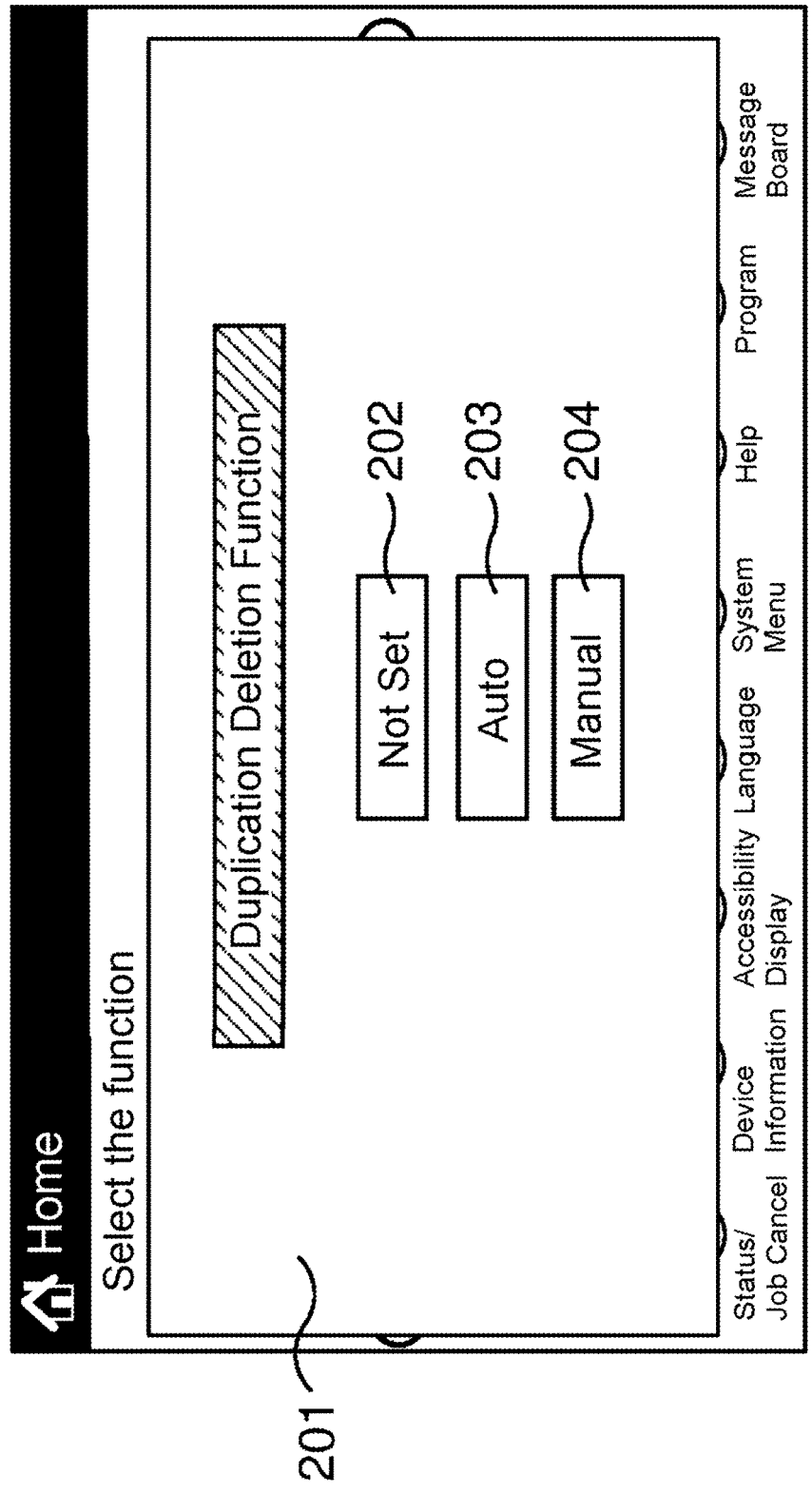
FIG. 6 illustrates one example of a setting screen.

FIG. 6 illustrates one example of the setting screen. With reference to FIG. 6, a setting screen 201 includes a key 202 not to set the duplication deletion function, a key 203 to configure the setting such that the duplicated character string is deleted not by the instruction from the user, and a key 204 to configure the setting such that the duplicated character string is deleted according to the instruction from the user.

(1) Deleting Duplicated Character String According to Instruction from User

The user presses the key 204 to configure the setting of the duplication deletion function such that the duplicated character string is deleted according to the instruction from the user. After pressing the key 204, the user places the document including a first image on the contact glass (not illustrated) of the image reading unit 11 and inputs an instruction to read the document via the operation unit 15.

Figure 7:
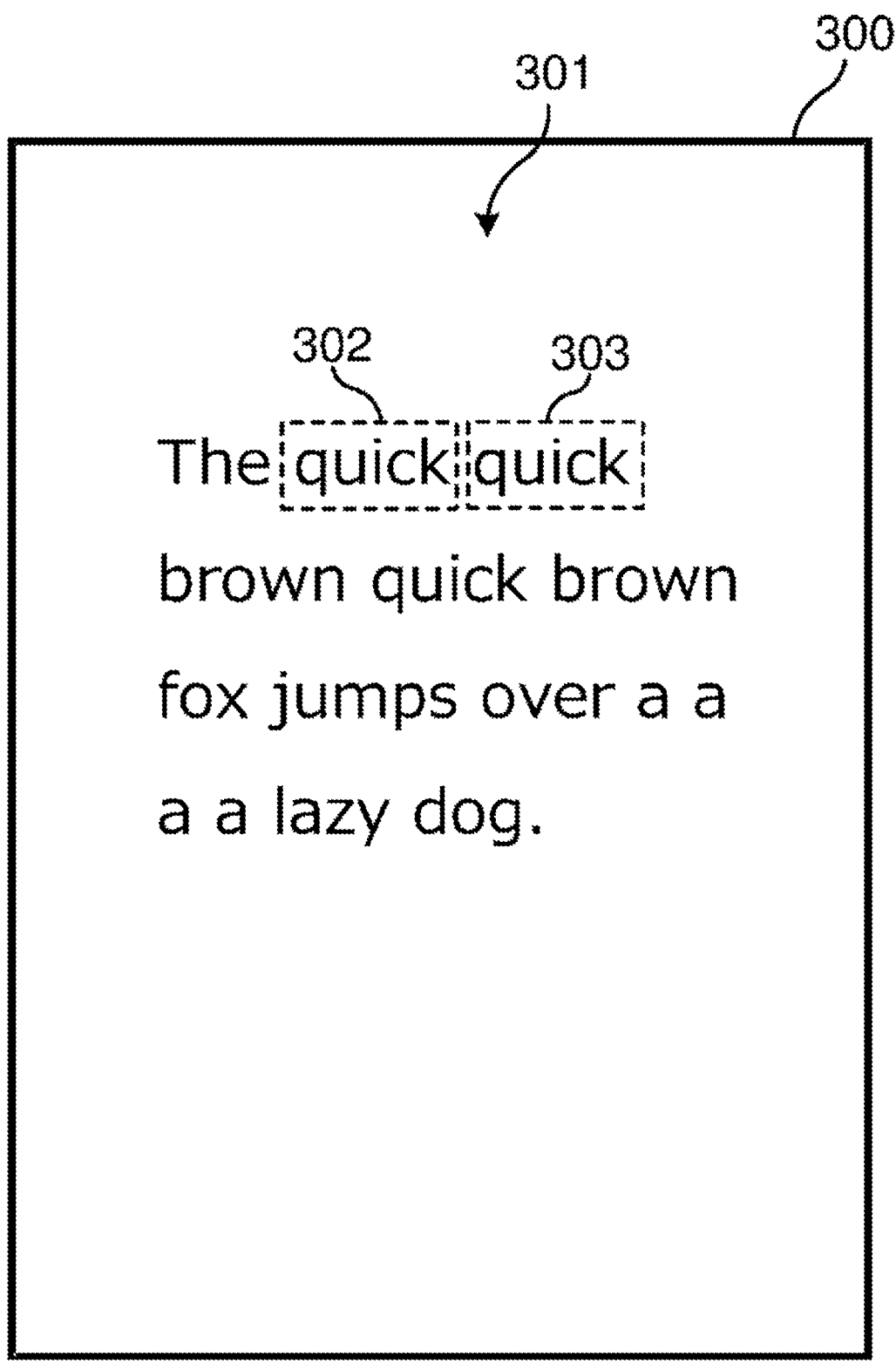
FIG. 7 illustrates one example of a first image.

FIG. 7 illustrates one example of the first image. With reference to FIG. 7, a first image 300 includes a character string 301 formed of a composition "The quick quick brown quick brown fox jumps over a a a a lazy dog." The character string 301 successively includes a first character string 302 formed of a word "quick" and a second character string 303 formed of a word "quick," which is identical to the first character string 302.

When the instruction to read the document is input to the operation unit 15, the controller 10 causes the image reading unit 11 to read the document and create the first image data. With reference to FIG. 3, when the first image data is created, the controller 10 determines that the image reading unit 11 has read the document (YES at Step S101) and executes the OCR process on the first image data to recognize all characters in the first image data (Step S102). The controller 10 extracts information on the character string 301 included in the first image 300 based on the recognized characters, creates first document data corresponding to the character string 301 based on the extracted information on the character string 301, and causes the HDD 19 to store the first document data (Step S103).

The controller 10 determines whether the character string 301 successively includes the first character string and at least the one second character string, which is identical to the first character string, or not based on the first document data stored in the HDD 19 (Step S104). Specifically, the controller 10 analyzes the first document data from the beginning and extracts the document data corresponding to the character string formed of, for example, the word, the segment, or the composition. The controller 10 determines whether the document data corresponding to the first character string and the document data corresponding to at least the one second character string are successively included or not based on the extracted document data.

With reference to FIG. 7, the first document data stored in the HDD 19 successively includes the document data corresponding to the first character string 302 and the document data corresponding to the second character string 303; therefore, the controller 10 determines that the character string 301 successively includes the first character string and at least the one second character string (YES at Step S104) and causes the display 16 to display a selection screen to select whether to delete the second character string 303 or not (Step S105).

Figure 8:
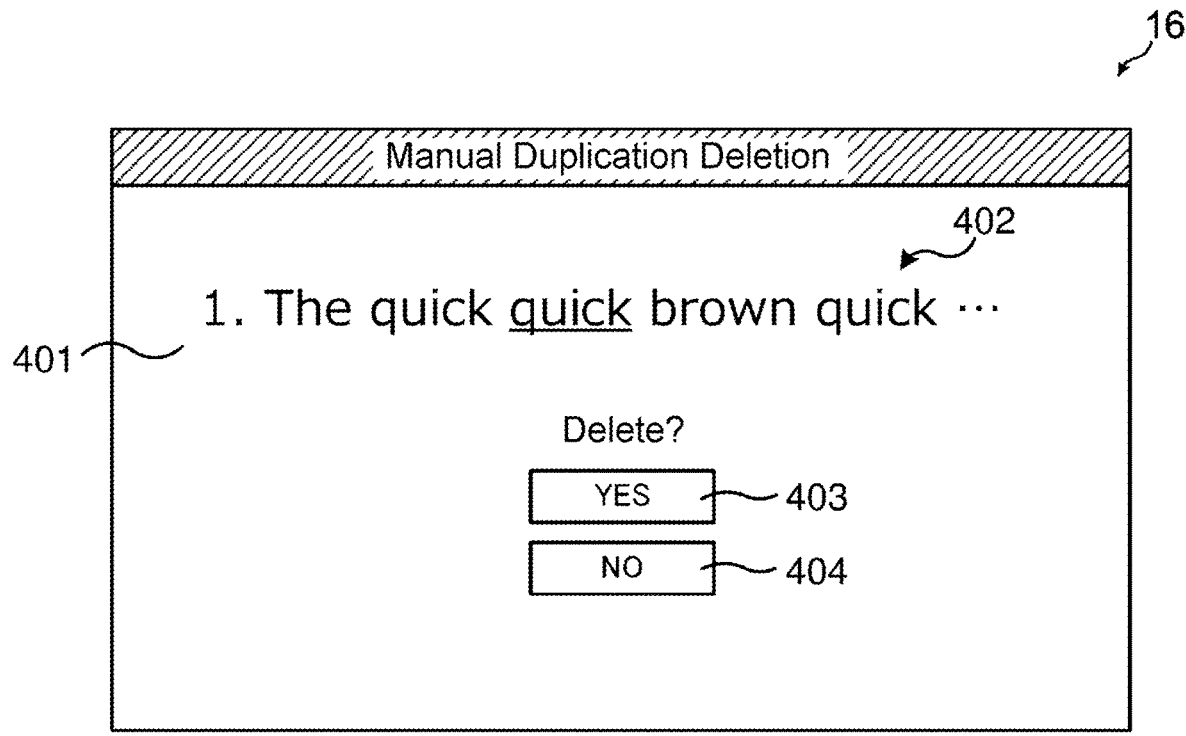
FIG. 8 illustrates one example of a selection screen.

FIG. 8 illustrates one example of the selection screen. With reference to FIG. 8, a selection screen 401 includes an area 402 that displays a character string including the first character string and the second character string. In the area 402, the second character string is displayed in a display format different from those of the other character strings, for example, emphasized by drawing an underline. The selection screen 401 includes a key 403 to input an instruction to delete the second character string and a key 404 to input an instruction not to delete the second character string 303 as software keys.

(1-1) Inputting Instruction to Delete Second Character String

The user who desires to delete the second character string 303 presses the key 403. Pressing the key 403 causes the controller 10 to determine that the instruction to delete the second character string 303 has been accepted via the touch panel 15*a* (YES at Step S106), delete the document data corresponding to the second character string 303 from the first document data using the first document data stored in the HDD 19, and create and store second document data (Step S107). Accordingly, the character string corresponding to the second document data stored in the HDD 19 becomes "The quick brown quick brown fox jumps over a a a a lazy dog."

The controller 10 again determines whether the character string 301 after the second character string, "quick," has been deleted successively includes the first character string and at least the one second character string or not based on the second document data stored in the HDD 19 (Step S104). The second document data stored in the HDD 19 successively includes the document data corresponding to the first character string formed of the two words, "quick brown," and the document data corresponding to the second character string formed of the two words, "quick brown," which is identical to the first character string; therefore, the controller 10 determines that the character string 301 successively includes the first character string and at least the one second character string (YES at Step S104) and causes the display 16 to display a selection screen (Step S105).

Figure 9:
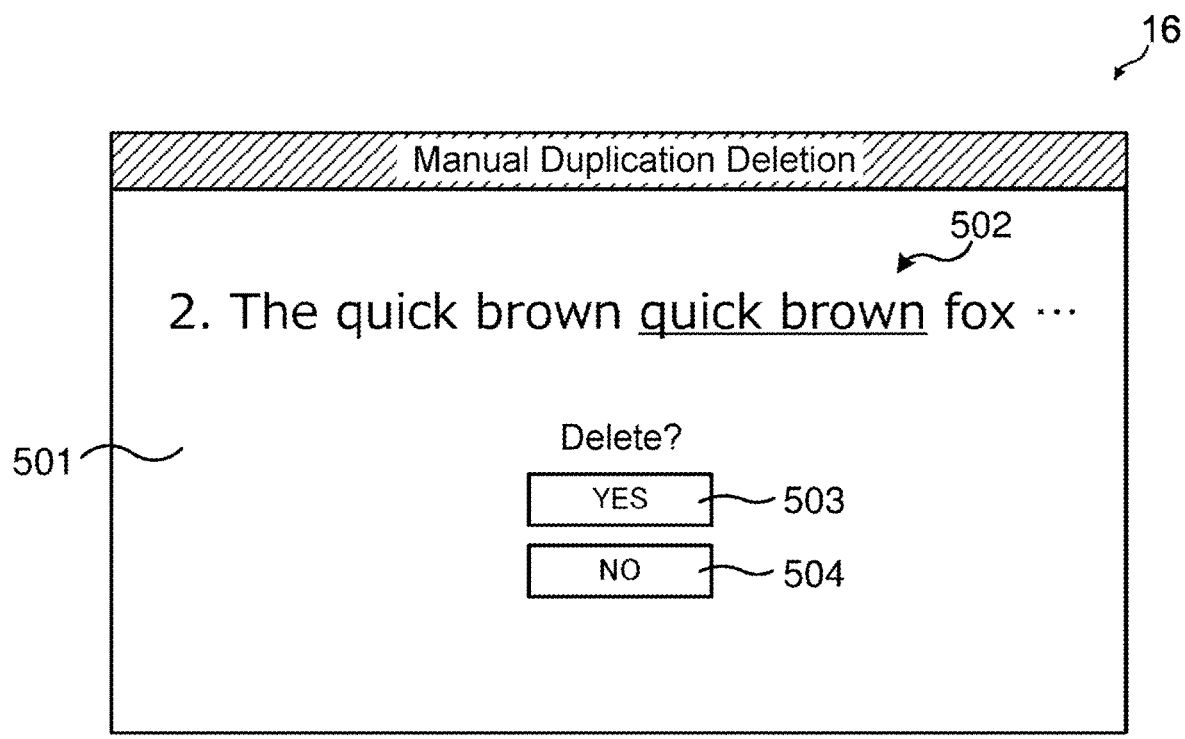
FIG. 9 illustrates another one example of the selection screen.

FIG. 9 illustrates another one example of the selection screen. With reference to FIG. 9, a selection screen 501 includes an area 502 that displays a character string including the first character string and the second character string. In the area 502, the character string "quick brown" as the second character string is displayed by being emphasized by drawing an underline. The selection screen 501 includes a key 503 to input the instruction to delete the second character string and a key 504 to input the instruction not to delete the second character string as software keys.

The user who desires to delete the second character string presses the key 503. Pressing the key 503 causes the controller 10 to determine that the instruction to delete the second character string has been accepted via the touch panel 15a (YES at Step S106) and delete the document data corresponding to the character string "quick brown" as the second character string from the second document data stored in the HDD 19 (Step S107). Accordingly, the character string corresponding to the second document data stored in the HDD 19 becomes "The quick brown fox jumps over a a a a lazy dog."

The controller 10 again determines whether the character string 301 after the second character string, "quick brown," has been deleted successively includes the first character string and at least the one second character string or not based on the second document data stored in the HDD 19 (Step S104). The second document data stored in the HDD 19 successively includes the document data corresponding to the first character string formed of one article, "a" and the document data corresponding to the three second character strings formed of one article, "a," which is identical to the first character string; therefore, the controller 10 determines that the character string 301 successively includes the first character string and at least the one second character string (YES at Step S104) and causes the display 16 to display a selection screen (Step S105).

Figure 10:
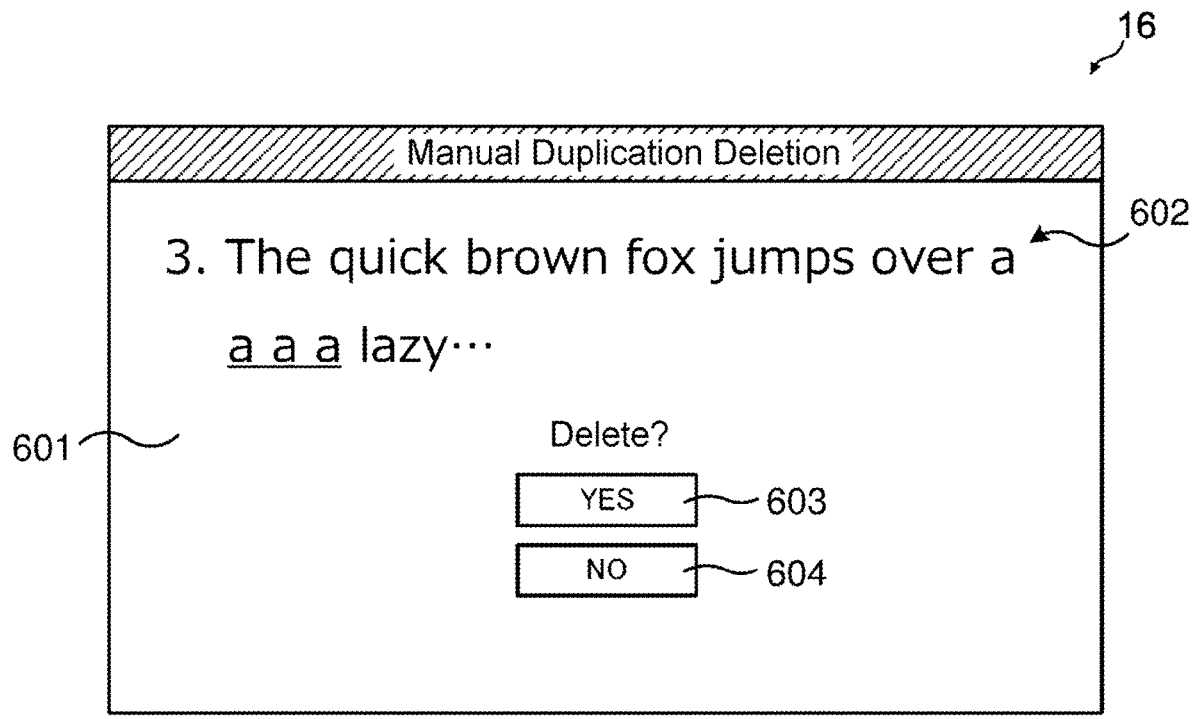
FIG. 10 illustrates another one example of the selection screen.

FIG. 10 illustrates another one example of the selection screen. With reference to FIG. 10, a selection screen 601 includes an area 602 that displays a character string including the first character string and the second character string. In the area 602, the character strings of the three "a" as the second character strings are displayed by being emphasized by drawing an underline. The selection screen 601 includes a key 603 to input the instruction to delete the second character string and a key 604 to input an instruction not to delete the second character string as software keys.

The "character string" in the embodiment also includes one character. The controller 10 determines that the character strings formed of one character are successive when it is determined that a character group including these successive characters does not form a word.

The user who desires to delete the second character strings presses the key 603. Pressing the key 603 causes the controller 10 to determine that the instruction to delete the second character string has been accepted via the touch panel 15a (YES at Step S106) and delete the document data corresponding to the character strings, three "a," as the second character strings from the second document data stored in the HDD 19 (Step S107). Accordingly, the character string corresponding to the second document data stored in the HDD 19 becomes "The quick brown fox jumps over a lazy dog."

The controller 10 again determines whether the character string 301 after the second character strings, three "a," have been deleted successively includes the first character string and at least the one second character string or not based on the second document data stored in the HDD 19 (Step S104). The second document data stored in the HDD 19 does not successively include the document data corresponding to the identical character string; therefore, the controller 10 determines that the character string 301 does not successively include the first character string and at least the one second character string (NO at Step S104) and causes the display 16 to display a determination screen to determine whether to terminate the first duplication deletion process or not (Step S108).

Figure 11:
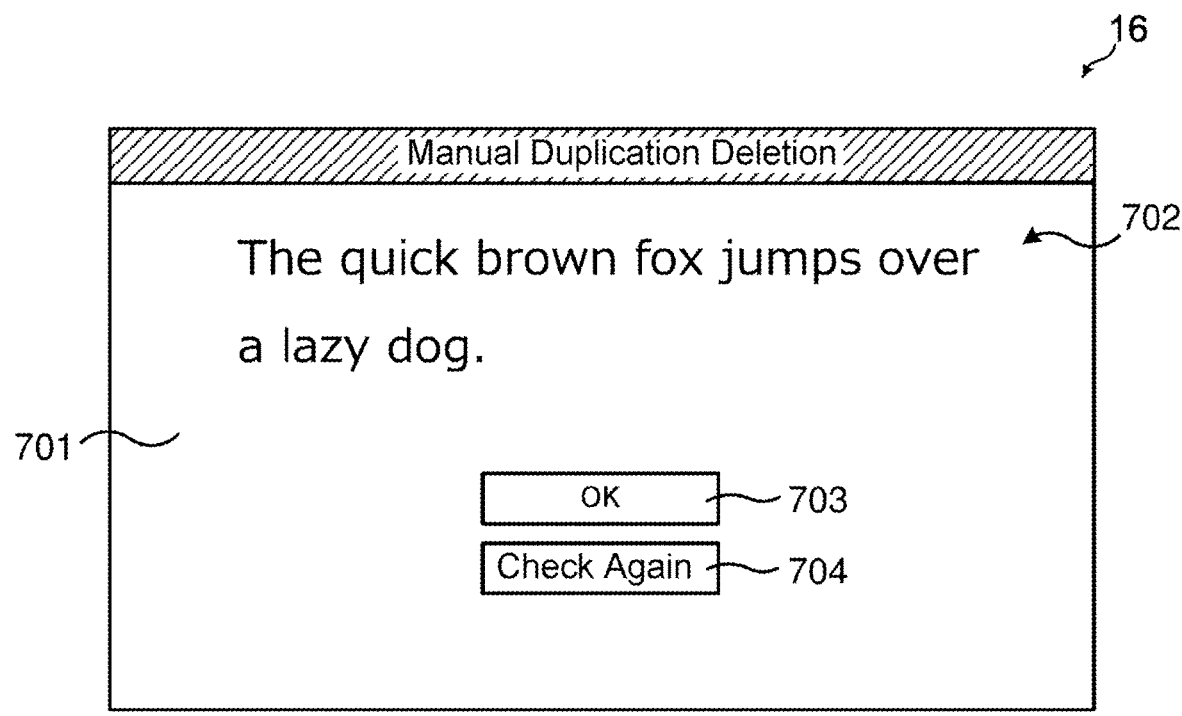
FIG. 11 illustrates one example of a determination screen.

FIG. 11 illustrates one example of the determination screen. With reference to FIG. 11, a determination screen 701 includes an area 702 that displays the character string corresponding to the second document data stored in the HDD 19. The determination screen 701 includes a key 703 to input an instruction to terminate the first duplication deletion process and a key 704 to input an instruction to re-execute the first duplication deletion process as software keys.

The user who accepts the character string displayed in the area 702 and desires to terminate the first duplication deletion process presses the key 703. Pressing the key 703 causes the controller 10 to determine that the instruction to terminate the first duplication deletion process has been accepted via the touch panel 15a (YES at Step S109), create second image data based on the first image data and the second document data stored in the HDD 19, store the second image data in the HDD 19 (Step S110), and terminate the first duplication deletion process.

Figure 12:
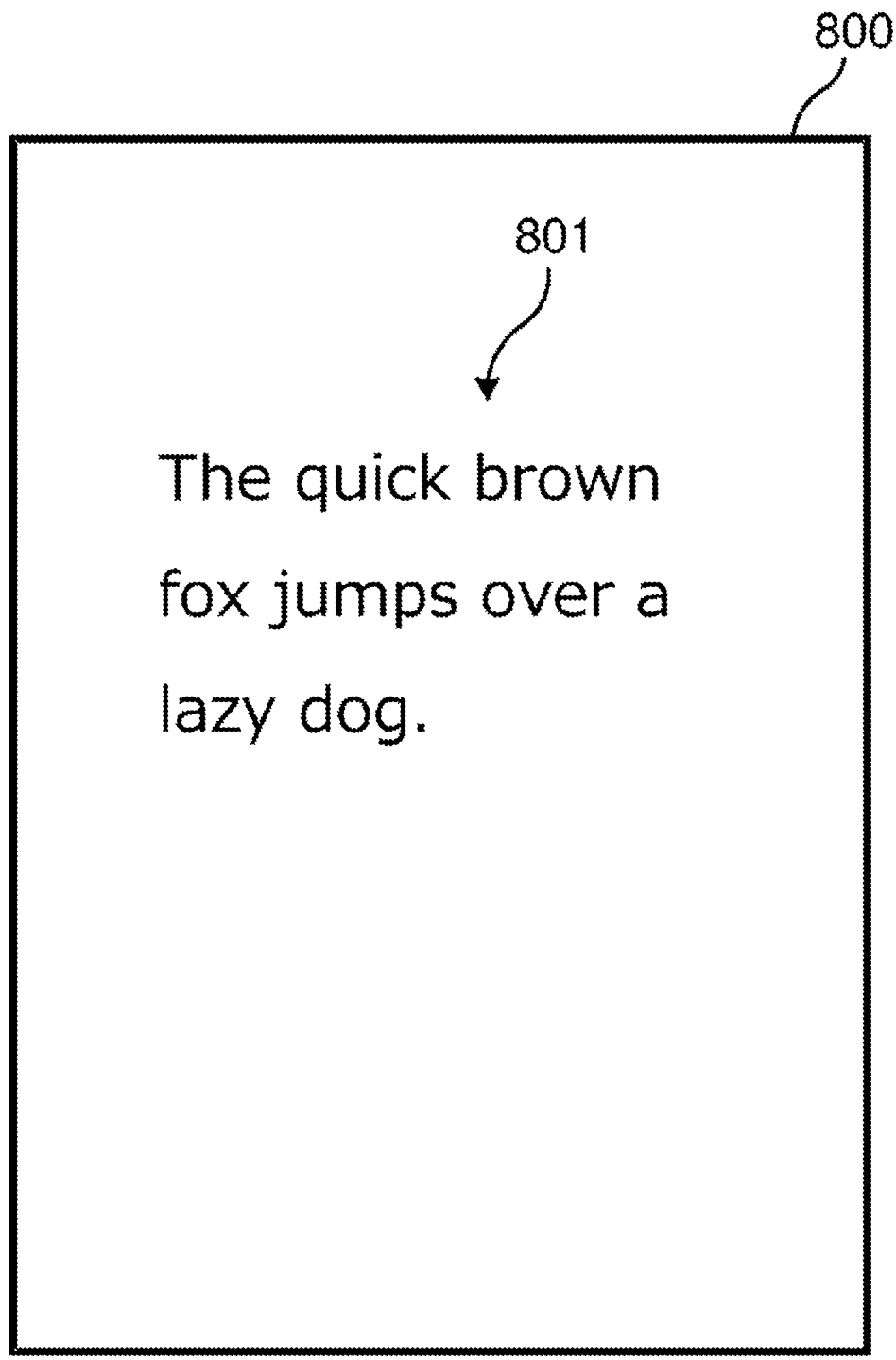
FIG. 12 illustrates one example of a second image.

FIG. 12 illustrates one example of the second image. With reference to FIG. 12, a second image 800 based on the second image data includes a character string 801 formed of a composition "The quick brown fox jumps over a lazy dog." The character string 801 is a character string after the character string "quick," the character string "quick brown," and the character strings of three "a" as the second character strings are deleted from the character string 301 included in the first image 300.

When the user inputs an instruction to print the document read by the image reading unit 11 via the operation unit 15, the controller 10 causes the image forming unit 12 or similar unit to print the second image 800 based on the second image data on a recording sheet.

Meanwhile, when the user who desires to re-execute the first duplication deletion process presses the key 704, the controller 10 determines that the instruction not to terminate the first duplication deletion process has been accepted via the touch panel 15a (NO at Step S109), again determines whether the character string 301 successively includes the first character string and at least the one second character string or not based on the second document data stored in the HDD 19 (Step S104), and re-executes the above-described first duplication deletion process.

(1-2) Inputting Instruction not to Delete Second Character String

With reference to FIG. 8, the user who has confirmed the selection screen 401 and does not desire to delete the second character string 303 presses the key 404. Pressing the key 404 causes the controller 10 to determine that the instruction not to delete the second character string 303 has been accepted via the touch panel 15a (NO at Step S106) and determine whether the character string 301 includes an unselected second character string on which whether to execute the deletion is not selected by the user or not based on the first document data stored in the HDD 19 (Step S111).

The first document data corresponding to the character string "The quick quick brown quick brown fox jumps over a a a a lazy dog." stored in the HDD 19 successively includes the document data corresponding to the first character string formed of one article, "a," and the document data corresponding to the three second character strings formed of one article, "a," which is identical to the first character string. The above-described three second character strings are the unselected character strings on which whether to execute the deletion is not selected by the user; therefore, the controller 10 determines that the character string 301 includes the unselected second character strings (YES at Step S111) and causes the display 16 to display a selection screen (Step S105).

Figure 13:
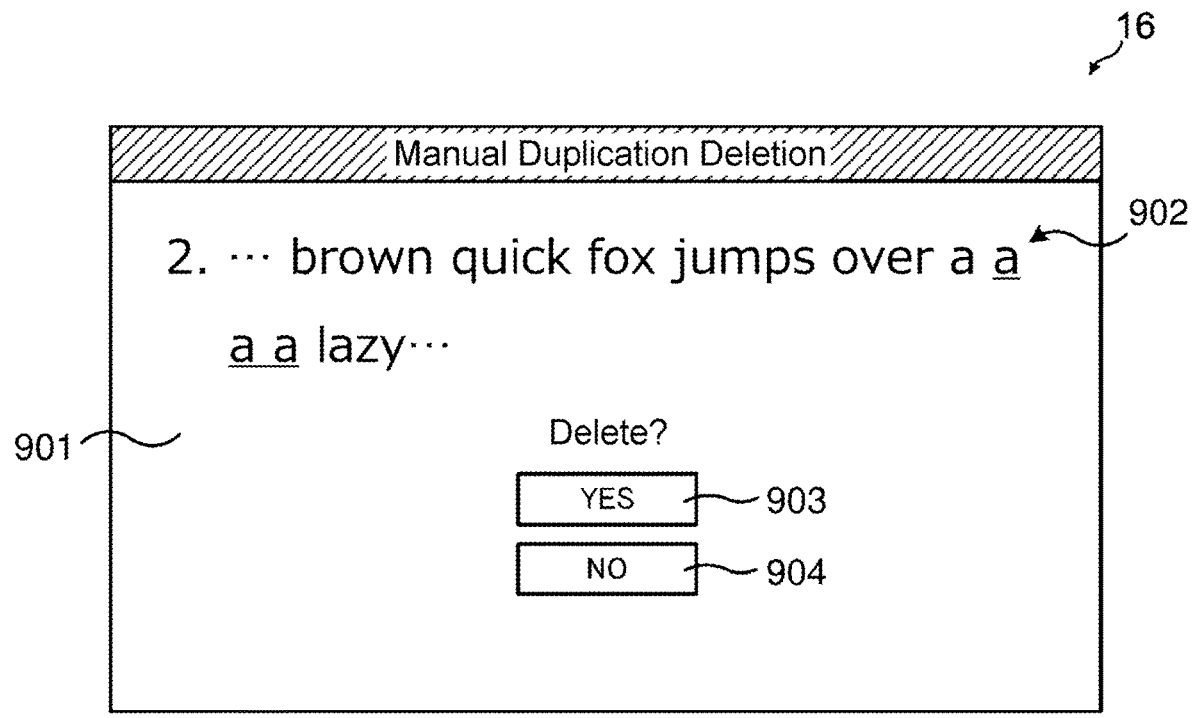
FIG. 13 illustrates another one example of the selection screen.

FIG. 13 illustrates another one example of the selection screen. With reference to FIG. 13, a selection screen 901 includes an area 902 that displays a character string including the first character string and the second character string. In the area 902, the three character strings of "a" as the second character strings are displayed by being emphasized by drawing an underline. The selection screen 901 includes a key 903 to input the instruction to delete the second character string and a key 904 to input the instruction not to delete the second character string as software keys.

The user who does not desire to delete the second character strings presses the key 904. Pressing the key 904 causes the controller 10 to determine that the instruction not to delete the second character string has been accepted via the touch panel 15*a* (NO at Step S106) and determine whether the character string 301 includes an unselected second character string or not based on the first document data stored in the HDD 19 (Step S111).

The first document data stored in the HDD 19 does not include the document data corresponding to the unselected second character string; therefore, the controller 10 determines that the character string 301 does not include the unselected second character string (NO at Step S111) and causes the display 16 to display a determination screen (Step S108).

Figure 14:
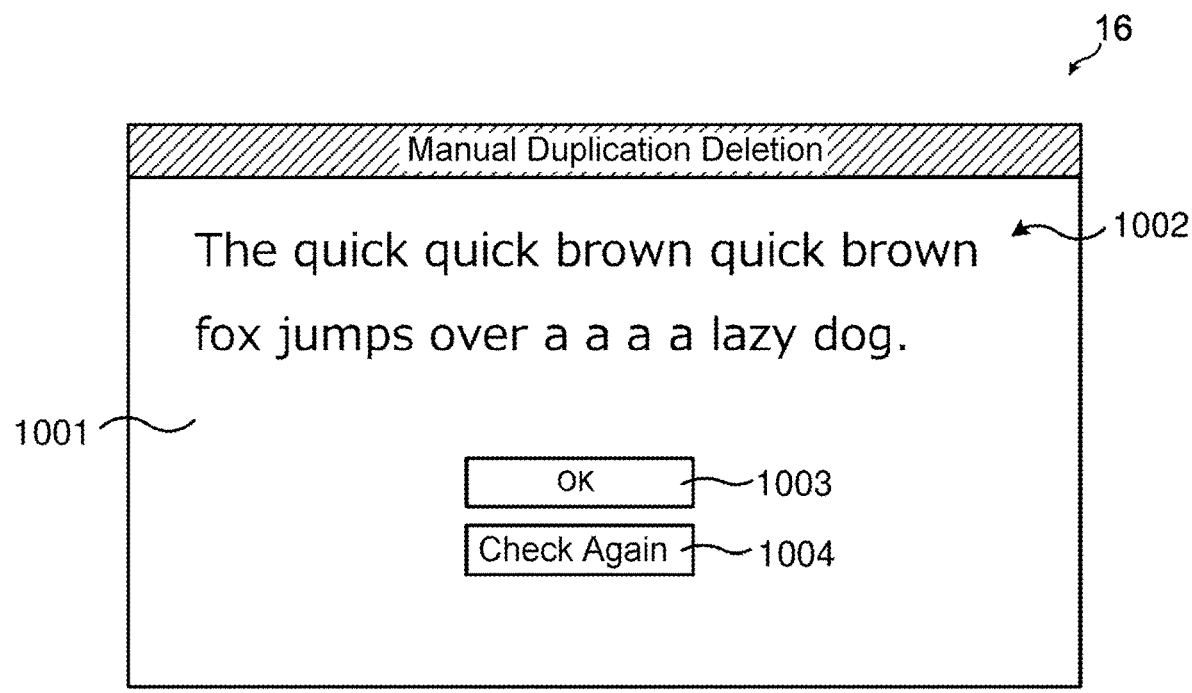
FIG. 14 illustrates another one example of the determination screen.

FIG. 14 illustrates another one example of the determination screen. With reference to FIG. 14, a determination screen 1001 includes an area 1002 that displays the character string corresponding to the first document data stored in the HDD 19. The determination screen 1001 includes a key 1003 to input the instruction to terminate the first duplication deletion process and a key 1004 to input the instruction to re-execute the first duplication deletion process as software keys.

The user who accepts the character string displayed in the area 1002 and desires to terminate the first duplication deletion process presses the key 1003. Pressing the key 1003 causes the controller 10 to determine that the instruction to terminate the first duplication deletion process has been accepted via the touch panel 15*a* (YES at Step S109), create the second image data based on the first image data and the first document data stored in the HDD 19, store the second image data in the HDD 19 (Step S110), and terminate the first duplication deletion process. In this case, since the deletion of the second character string from the character string 301 is not executed at all, the second image based on the second image data is identical to the first image 300.

When the user inputs the instruction to print the document read by the image reading unit 11 via the operation unit 15, the controller 10 causes the image forming unit 12 or similar unit to print the second image based on the second image data on a recording sheet.

Meanwhile, when the user who desires to re-execute the first duplication deletion process presses the key 1004, the controller 10 determines that the instruction not to terminate the first duplication deletion process has been accepted via the touch panel 15*a* (NO at Step S109), again determines whether the character string 301 successively includes the first character string and at least the one second character string or not based on the first document data stored in the HDD 19 (Step S104), and re-executes the above-described first duplication deletion process.

(2) Deleting Duplicated Character String not by Instruction from User

With reference to FIG. 6, the user who has confirmed the setting screen 201 presses the key 203 and configures the setting of the duplication deletion function such that the duplicated character string is deleted not by the instruction from the user. After pressing the key 203, the user places the document including the first image 300 on the contact glass (not illustrated) of the image reading unit 11 and inputs an instruction to read the document via the operation unit 15.

With reference to FIG. 7, the first image 300 includes the character string 301 formed of the composition "The quick quick brown quick brown fox jumps over a a a a lazy dog." When the instruction to read the document is input to the operation unit 15, the controller 10 causes the image reading unit 11 to read the document and create the first image data.

With reference to FIG. 4, when the first image data is created, the controller 10 determines that the image reading unit 11 has read the document (YES at Step S201) and executes the OCR process on the first image data to recognize all characters in the first image data (Step S202). The controller 10 extracts the information on the character string 301 included in the first image 300 based on the recognized characters, creates the first document data corresponding to the character string 301 based on the extracted information on the character string 301 and causes the HDD 19 to store the first document data (Step S203).

The controller 10 determines whether the character string 301 successively includes the first character string and at least the one second character string or not based on the first document data stored in the HDD 19 (Step S204).

With reference to FIG. 7, the first document data stored in the HDD 19 successively includes the document data corresponding to the first character string 302 and the document data corresponding to the second character string 303; therefore, the controller 10 determines that the character string 301 successively includes the first character string and at least the one second character string (YES at Step S204) and deletes the document data corresponding to the second character string 303 from the first document data using the first document data stored in the HDD 19 to create and store the second document data (Step S205). Accordingly, the character string corresponding to the second document data stored in the HDD 19 becomes "The quick brown quick brown fox jumps over a a a a lazy dog."

The controller 10 again determines whether the character string 301 after the second character string, "quick," has been deleted successively includes the first character string and at least the one second character string or not based on the second document data stored in the HDD 19 (Step S204).

The second document data stored in the HDD 19 successively includes the document data corresponding to the first character string formed of the two words, "quick brown," and the document data corresponding to the second character string formed of the two words, "quick brown," which is identical to the first character string; therefore, the controller 10 determines that the character string 301 successively includes the first character string and at least the one second character string (YES at Step S204) and deletes the document data corresponding to the character string "quick brown" as the second character string from the second document data stored in the HDD 19 (Step S205). Accordingly, the character string corresponding to the second document data stored in the HDD 19 becomes "The quick brown fox jumps over a a a a lazy dog."

The controller 10 again determines whether the character string 301 after the second character string, "quick brown," has been deleted successively includes the first character string and at least the one second character string or not based on the second document data stored in the HDD 19 (Step S204).

The second document data stored in the HDD 19 successively includes the document data corresponding to the first character string formed of one article, "a," and the document data corresponding to the three second character strings formed of one article, "a," which is identical to the first character string; therefore, the controller 10 determines that the character string 301 successively includes the first character string and at least the one second character string (YES at Step S204) and deletes the document data corresponding to the three character strings of "a" as the second character string from the second document data stored in the HDD 19 (Step S205). Accordingly, the character string corresponding to the second document data stored in the HDD 19 becomes "The quick brown fox jumps over a lazy dog."

The controller 10 again determines whether the character string 301 after the second character strings, three "a," have been deleted successively includes the first character string and at least the one second character string or not based on the second document data stored in the HDD 19 (Step S204). The second document data stored in the HDD 19 does not successively include the document data corresponding to the identical character string; therefore, the controller 10 determines that the character string 301 does not successively include the first character string and at least the one second character string (NO at Step S204) and causes the display 16 to display a determination screen (Step S206).

Figure 15:
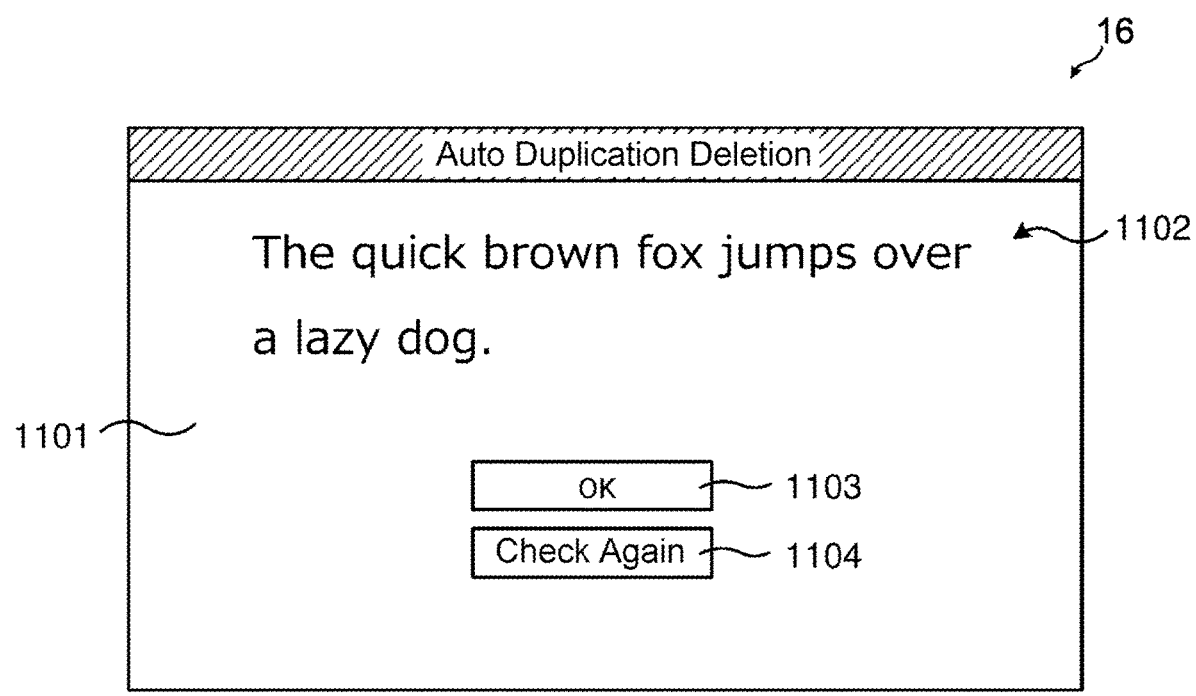
FIG. 15 illustrates another one example of the determination screen.

FIG. 15 illustrates another one example of the determination screen. With reference to FIG. 15, a determination screen 1101 includes an area 1102 that displays the character string corresponding to the second document data stored in the HDD 19. The determination screen 1101 includes a key 1103 to input an instruction to terminate the second duplication deletion process and a key 1004 to input an instruction to re-execute the second duplication deletion process as software keys.

The user who has confirmed the determination screen 1101, accepts the character string displayed in the area 1102, and desires to terminate the second duplication deletion process presses the key 1103. Pressing the key 1103 causes the controller 10 to determine that the instruction to terminate the second duplication deletion process has been accepted via the touch panel 15a (YES at Step S207), create the second image data corresponding to the second image 800 based on the first image data and the second document data stored in the HDD 19, store the second image data in the HDD 19 (Step S208), and terminate the second duplication deletion process.

Meanwhile, when the user who desires to re-execute the second duplication deletion process presses the key 1104, the controller 10 determines that the instruction not to terminate the second duplication deletion process has been accepted via the touch panel 15a (NO at Step S207), again determines whether the character string 301 successively includes the first character string and at least the one second character string or not based on the second document data stored in the HDD 19 (Step S204), and re-executes the above-described second duplication deletion process.

(3) Not Setting Duplication Deletion Function

With reference to FIG. 6, the user who has confirmed the setting screen 201 presses the key 202 so as not to set the duplication deletion function. After pressing the key 202, the user places the document including the first image 300 on the contact glass (not illustrated) of the image reading unit 11 and inputs the instruction to read the document via the operation unit 15.

When the instruction to read the document is input to the operation unit 15, the controller 10 causes the image reading unit 11 to read the document and create the first image data. The controller 10 causes the HDD 19 to store the first image data without the execution of the above-described first duplication deletion process and second duplication deletion process.

When the user inputs the instruction to print the document read by the image reading unit 11 via the operation unit 15, the controller 10 causes the image forming unit 12 or similar unit to print the first image 300 based on the first image data on a recording sheet.

With the above-described embodiment, when the character string 301 successively includes the first character string and at least the one second character string identical to the first character string, the controller 10 creates the second document data from which the document data corresponding to the second character string has been deleted from the first document data using the first document data.

This eliminates the need for the user to determine whether the document includes the duplicated character strings or not when the duplicated character string is deleted, thereby ensuring eliminating a labor of the user required to confirm the printed image.

Additionally, this eliminates the need for the user to execute a correction of deleting the document data corresponding to the duplicated character string from the document data corresponding to the character string included in the document using a computer, thereby ensuring eliminating a labor of the user required for the correction. Furthermore, even when the document data corresponding to the character string included in the document is not stored in the computer, this configuration eliminates the need for the user to create the document data again, thereby also ensuring reducing a burden on the user.

With the above-described embodiment, when the character string 301 successively includes the first character string and at least the one second character string, the controller 10 causes the display 16 to display the selection screen 401, 501, 601, or 901 including the first character string and at least the one second character string, and after causing the display 16 to display the selection screen 401, 501, 601, or 901, the controller 10 creates the second document data when the instruction to delete the second character string is input to the operation unit 15.

Accordingly, after the confirmation of the selection screen 401, 501, 601, or 901, the user can give the instruction to delete the duplicated character string; therefore, a convenience of the user is improved.

With the above-described embodiment, when the deletion of the second character string is preset so as to be executed not by the instruction from the user and the character string 301 successively includes the first character string and at least the one second character string, the controller 10 creates the second document data without causing the display 16 to display the selection screen 401, 501, 601, or 901.

Accordingly, when the image on the document includes the duplicated character strings, the second document data is created without the confirmation of the content of the image on the document and giving the instruction to delete the duplicated character string by the user; therefore, the labor of the user can be further reduced.

With the above-described embodiment, the controller 10 causes the display 16 to display the selection screen 401, 501, 601, or 901 that displays the second character string 303 in the display format different from those of the other character strings. Accordingly, the user can easily confirm the duplicated character included in the image on the document, thereby further improving the convenience of the user.

With the above-described embodiment, the image forming unit 12 or similar unit prints the image based on the first document data or the image based on the second document data on the recording sheet. Accordingly, when the image on the document includes the duplicated character strings, the user can easily acquire the second image 800 based on the second document data. The second image 800 can be acquired without printing the first image 300, and this avoids a resource to be wasteful.

First Modification

A configuration of the image forming apparatus 1 including the image processing apparatus 2 according to the first modification of the disclosure is identical to the image forming apparatus 1 according to the above-described embodiment except for points that a third duplication deletion process is executed instead of the first duplication deletion process and a configuration of a selection screen is different. The following describes the points different from the above-described embodiment.

Instead of the above-described first control program, the HDD 19 stores a third control program to execute the third duplication deletion process according to the first modification. The controller 10 behaves in accordance with the third control program to execute the third duplication deletion process according to the first modification. The third duplication deletion process may be configured to be operable by a hardware circuit not by the behavior based on the computer program.

Behaviors

Figure 16:
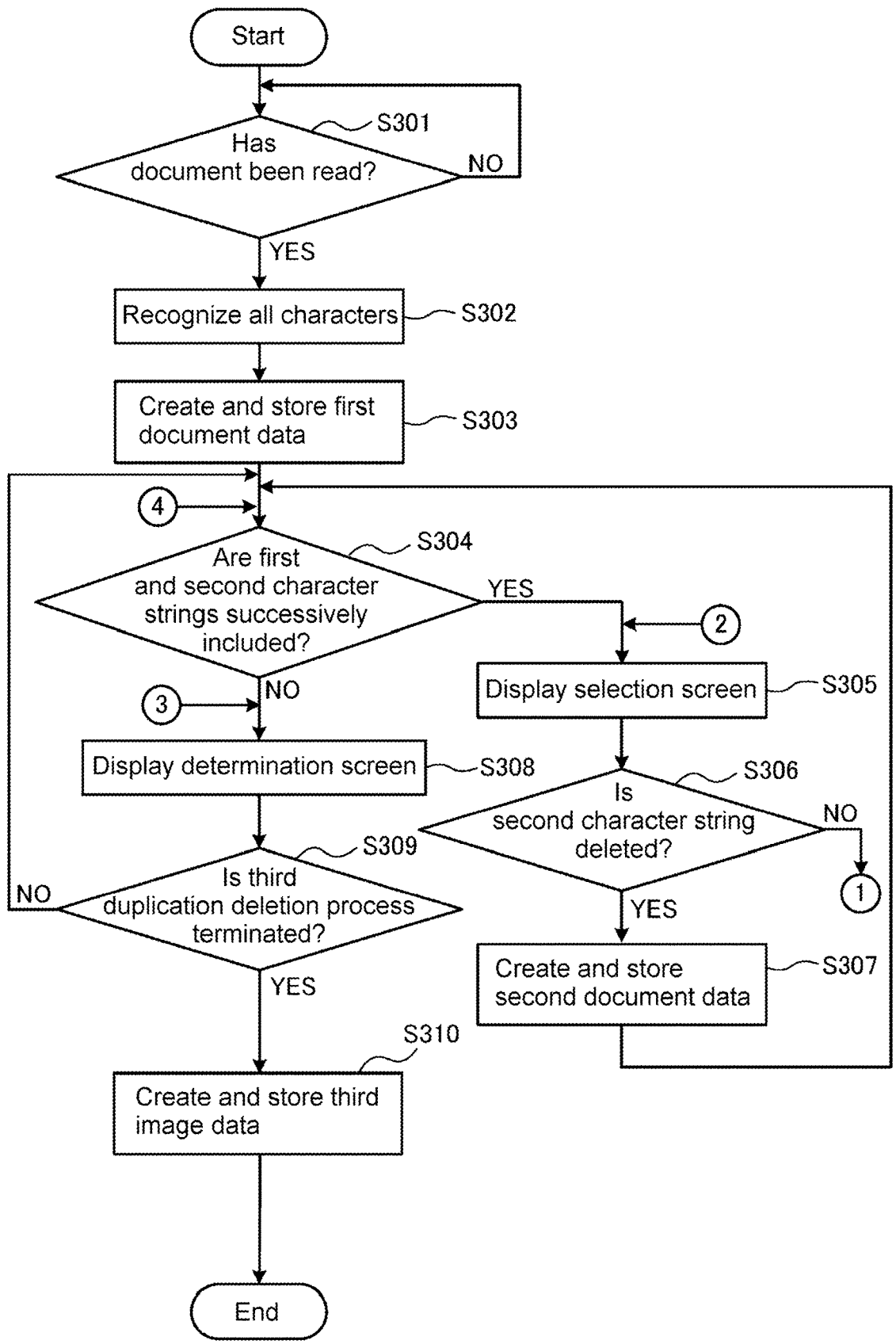
FIG. 16 illustrates a third duplication deletion process according to a first modification.
Figure 17:
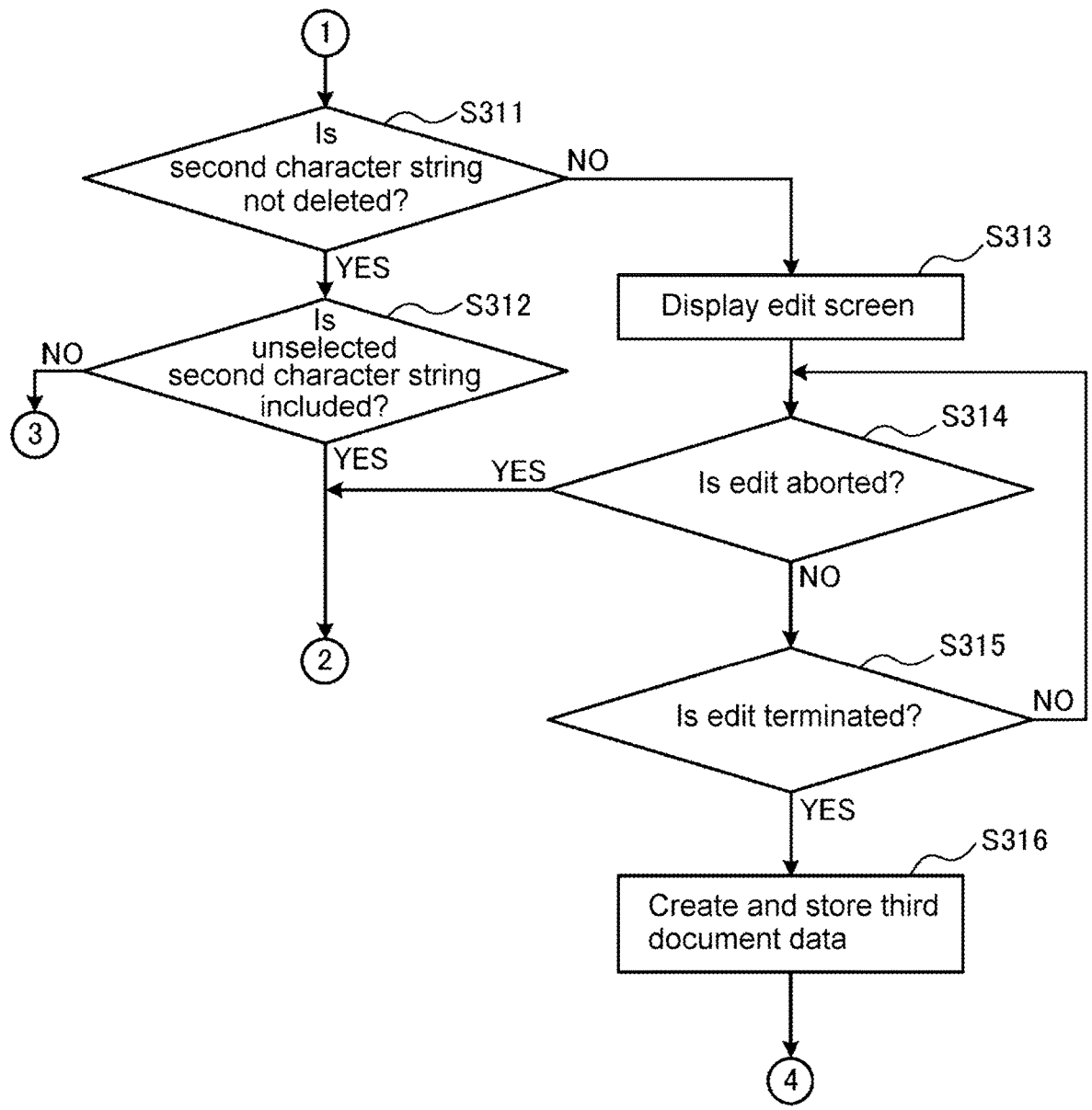
FIG. 17 illustrates the third duplication deletion process according to the first modification.

FIG. 16 and FIG. 17 illustrate the third duplication deletion process. Processes of Step S301 to Step S309 and Step S312 in the third duplication deletion process are identical to the processes of Step S101 to Step S109 and Step S111 in the first duplication deletion process.

While the following describes a control structure of the third control program to execute the third duplication deletion process together with the behaviors of the image forming apparatus 1, the behaviors identical to those of the embodiment will not be repeatedly described. In the following, it is assumed that the first image included in the document includes a character string formed of a composition "The quick brown fox jumps over a lazy lazy dog."

With reference to FIG. 16, when the controller 10 determines that the character string included in the first image successively includes the first character string and at least the one second character string (YES at Step S304), the controller 10 causes the display 16 to display a selection screen (Step S305).

Figure 18:
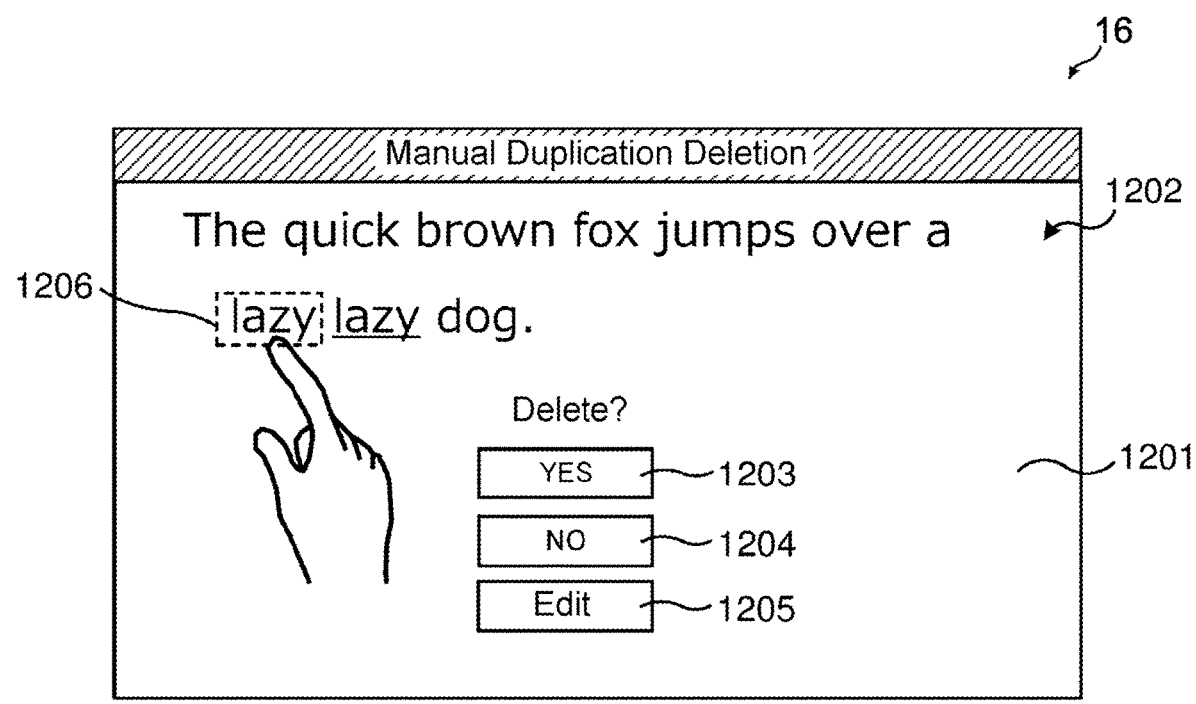
FIG. 18 illustrates one example of a selection screen according to the first modification.

FIG. 18 illustrates one example of a selection screen 1201 according to the first modification. With reference to FIG. 18, the selection screen 1201 includes an area 1202 that displays the character string including the first character string and the second character string. In the area 1202, the second character string is displayed by being emphasized by drawing an underline. The selection screen 1201 includes a key 1203 to input the instruction to delete the second character string, a key 1204 to input the instruction not to delete the second character string, and a key 1205 to input an instruction to edit the character string as software keys.

The user executes a tap operation on a part of a character string 1206 formed of a word "lazy" desired to edit to designate the character string 1206 as the edit target, and then presses the key 1205.

In the embodiment, the controller 10 recognizes blank parts in the character strings to recognize the respective character strings in units of words. Therefore, when the controller 10 accepts the tap operation to the touch panel 15*a*, the controller 10 recognizes a character string corresponding to a word included in a part contacted with a finger of the user as the character string as the edit target.

With reference to FIG. 17, pressing the key 1205 causes the controller 10 to determine that the instruction to delete the second character string is not accepted via the touch panel 15*a* (NO at Step S306) and also determine that the instruction not to delete the second character string is not accepted (NO at Step S311), and the controller 10 causes the display 16 to display an edit screen to edit the character string 1206 (Step S313).

Figure 19:
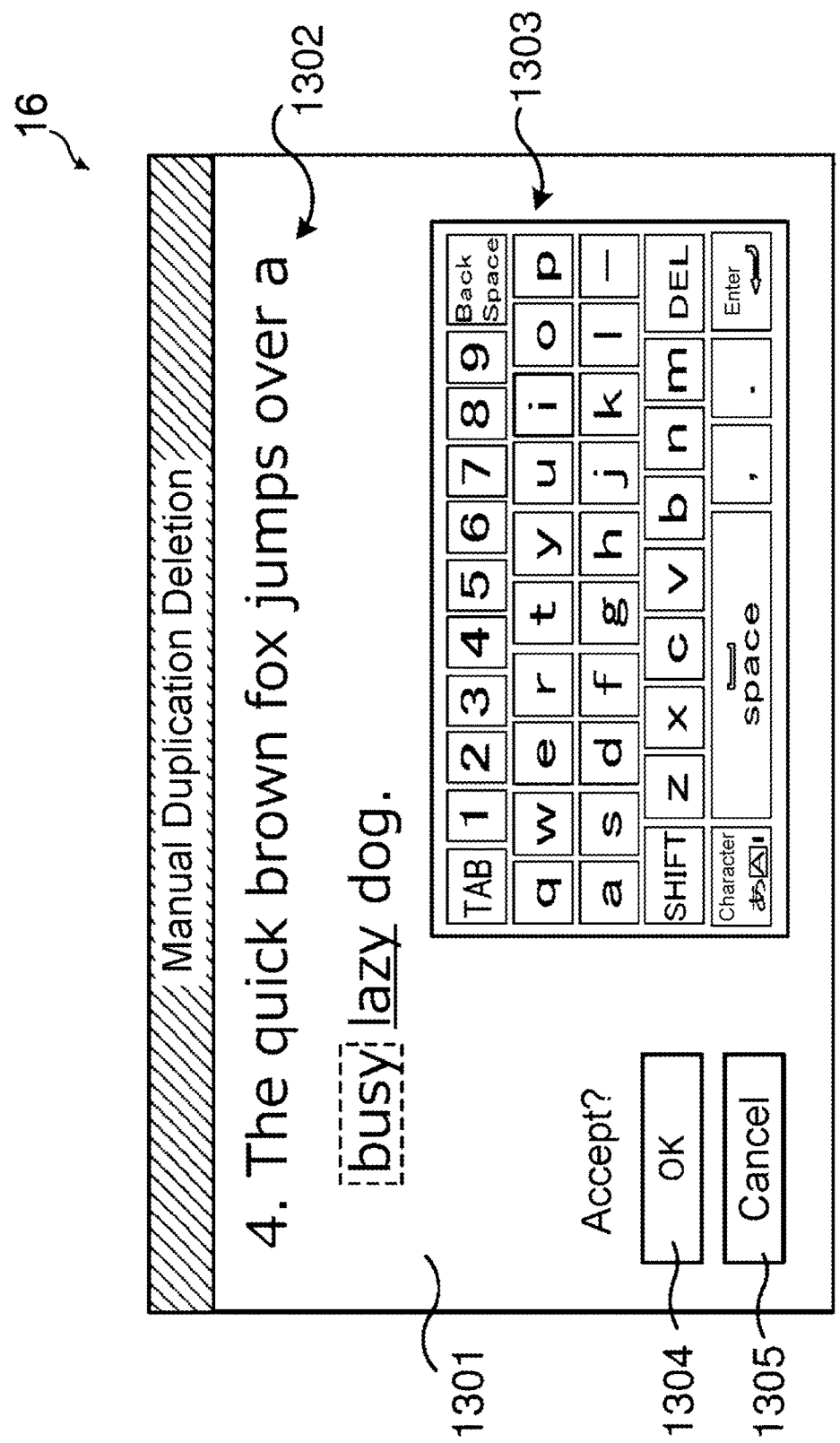
FIG. 19 illustrates one example of an edit screen according to the first modification.

FIG. 19 illustrates one example of the edit screen according to the first modification. An edit screen 1301 includes an area 1302 that displays a character string including the character string 1206 as the edit target. The edit screen 1301 includes a keyboard image 1303 including a plurality of software keys to input a character or the like. The edit screen 1301 includes a key 1304 to input an instruction to terminate editing the character string and a key 1305 to input an instruction to abort editing the character string as software keys. When the user presses the key 1305, the controller 10 determines that the instruction to abort editing the character string has been accepted via the touch panel 15*a* (YES at Step 314) and causes the display 16 to display the selection screen 1201 again (Step S305).

After inputting an instruction to change the character string as the edit target from "lazy" to "busy" via the software keys of the keyboard image 1303, the user presses the key 1304. Pressing the key 1304 causes the controller 10 to determine that the instruction to abort editing the character string is not accepted via the touch panel 15*a* (NO at Step S314) and determines that the instruction to terminate editing the character string has been accepted (YES at Step S315).

Afterwards, the controller 10 uses the first document data stored in the HDD 19 to execute editing to replace the document data corresponding to the character string "lazy" as the edit target with the document data corresponding to the character string "busy" in the first document data, creates third document data, and causes the HDD 19 to store the third document data (Step S316). Accordingly, the character string corresponding to the third document data stored in the HDD 19 becomes "The quick brown fox jumps over a busy lazy dog."

After editing the character string, the third document data stored in the HDD 19 does not successively include the document data corresponding to the identical character string; therefore, the controller 10 determines that the character string 301 does not successively include the first character string and at least the one second character string (NO at Step S304) and causes the display 16 to display a determination screen (not illustrated) to determine whether to terminate the third duplication deletion process or not (Step S308).

This determination screen has a configuration similar to those of the above-described determination screens 701, 1001, and 1101 and includes an area that displays the character string corresponding to the third document data stored in the HDD 19, a first software key to input an instruction to terminate the third duplication deletion process, and a second software key to input an instruction to re-execute the third duplication deletion process.

The user who accepts the character string displayed in the area and desires to terminate the third duplication deletion process presses the first software key. Pressing the first software key causes the controller 10 to determine that the instruction to terminate the third duplication deletion process has been accepted via the touch panel 15*a* (YES at Step S309), create third image data corresponding to the third image in which the character string "lazy" in the first image has been changed to a character string "busy" based on the first image data and the third document data stored in the HDD 19, cause the HDD 19 to store the third image data (Step S310), and terminate the third duplication deletion process.

When the user inputs the instruction to print the document read by the image reading unit 11 via the operation unit 15, the controller 10 causes the image forming unit 12 or similar unit to print the third image based on the third image data on a recording sheet.

With the first modification, after the controller 10 causes the display 16 to display the selection screen 1201 including the first character string and the second character string, when the instruction to edit the character string is input to the operation unit 15, the controller 10 creates the third document data produced by editing the first document data using the first image data according to the edit instruction.

Accordingly, in addition to the deletion of the duplicated character string, the character string included in the document can be corrected and edited, thereby further improving the convenience of the user.

Second Modification

A configuration of the image forming apparatus 1 including the image processing apparatus 2 according to the second modification of the disclosure is identical to the image forming apparatus 1 according to the above-described embodiment except for points that a configuration of the touch panel 15*a* in the operation unit 15 and a configuration of a selection screen are different. The following describes the points different from the above-described embodiment.

In the operation unit 15, the touch panel 15*a* has a configuration to which the instruction to delete the second character string is input through an operation of a swipe operation in a left direction as a first operation method on the touch panel 15*a*. Additionally, the touch panel 15*a* has a configuration to which the instruction not to delete the second character string is input through an operation of the swipe operation in a right direction as a second operation method on the touch panel 15*a*.

Behaviors

While the following describes the behaviors of the image forming apparatus 1 according to the second modification, the behaviors identical to those of the embodiment will not be repeatedly described.

Figure 20:
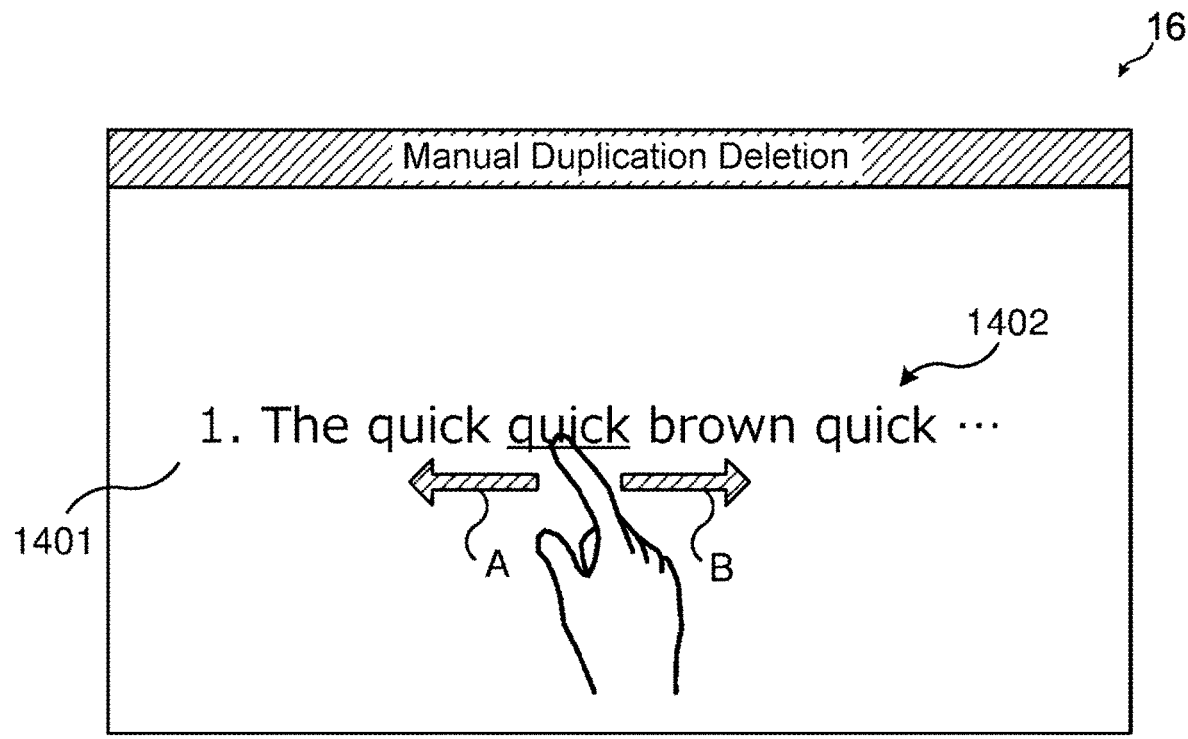
FIG. 20 illustrates one example of a selection screen according to a second modification.

FIG. 20 illustrates one example of a selection screen 1401 according to the second modification. With reference to FIG. 20, the selection screen 1401 includes an area 1402 that displays a character string including the first character string and the second character string. In the area 1402, the second character string is displayed by being emphasized by drawing an underline.

(1) Inputting Instruction to Delete Second Character String

With reference to FIG. 3 and FIG. 20, the user who desires to delete the second character string executes the swipe operation in the left direction indicated by the arrow A on a part where the second character string is displayed on the touch panel 15*a*. This swipe operation is started with the part where the second character string as the processing target is displayed as a starting point. When this swipe operation in the left direction is accepted via the touch panel 15*a*, the controller 10 determines that the instruction to delete the second character string has been accepted (YES at Step S106).

(2) Inputting Instruction not to Delete Second Character String

The user who does not desire to delete the second character string executes the swipe operation in the right direction indicated by the arrow B on a part where the second character string is displayed on the touch panel 15*a*. This swipe operation is also started with the part where the second character string as the processing target is displayed as the starting point. When this swipe operation in the right direction is accepted via the touch panel 15*a*, the controller 10 determines that the instruction not to delete the second character string has been accepted (NO at Step S106).

With the second modification, the user can input the instruction to delete the second character string or the instruction not to delete the second character string by the sensuous operation to the touch panel 15*a*. Accordingly, the convenience of the user is further improved.

Third Modification

A configuration of the image forming apparatus 1 including the image processing apparatus 2 according to the third modification of the disclosure is identical to the image forming apparatus 1 according to the above-described second modification except for a point that a configuration of the touch panel 15*a* in the operation unit 15 is different. The following describes the point different from the above-described second modification.

In the operation unit 15, the touch panel 15*a* has a configuration to which the instruction to delete the second character string formed of a composition is input through an operation of a swipe operation in an upper direction as a third operation method on the touch panel 15*a*. Additionally, the touch panel 15*a* has a configuration to which the instruction not to delete the second character string formed of the composition is input through an operation of the swipe operation in a downward direction as a fourth operation method on the touch panel 15*a*.

Behaviors

While the following describes the behaviors of the image forming apparatus 1 according to the third modification, the behaviors identical to those of the embodiment and the second modification will not be repeatedly described.

Figure 21:
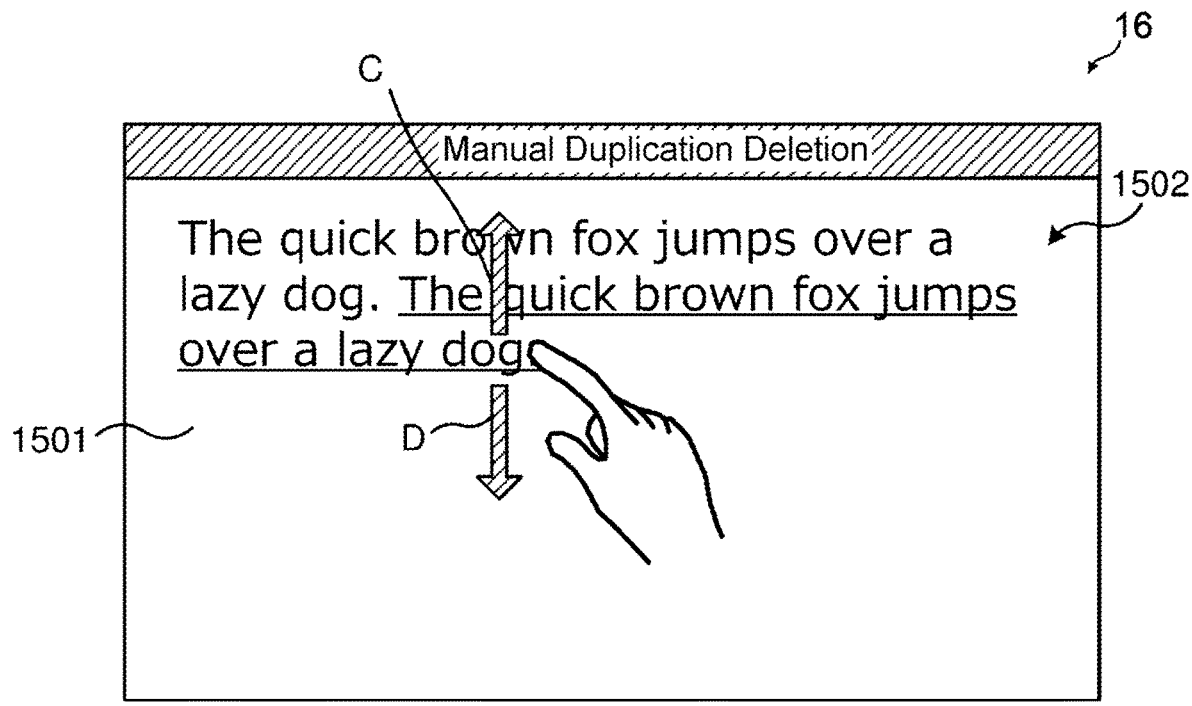
FIG. 21 illustrates one example of a selection screen according to a third modification.

FIG. 21 illustrates one example of a selection screen according to the third modification. With reference to FIG. 21, a selection screen 1501 includes an area 1502 that displays a character string including the first character string formed of a composition and the second character string formed of a composition identical to that of the first character string. In the area 1502, the second character string is displayed by being emphasized by drawing an underline.

(1) Inputting Instruction to Delete Second Character String

With reference to FIG. 3 and FIG. 21, the user who desires to delete the second character string executes the swipe operation in the upper direction indicated by the arrow C on the touch panel 15a. This swipe operation is also started with the part where the second character string as the processing target is displayed as a starting point. When this swipe operation in the upper direction is accepted via the touch panel 15a, the controller 10 determines that the instruction to delete the second character string has been accepted (YES at Step S106).

(2) Inputting Instruction not to Delete Second Character String

The user who does not desire to delete the second character string executes the swipe operation in the downward direction indicated by the arrow D on the touch panel 15a. This swipe operation is also started with the part where the second character string as the processing target is displayed as a starting point. When this swipe operation in the downward direction is accepted via the touch panel 15a, the controller 10 determines that the instruction not to delete the second character string has been accepted (NO at Step S106).

With the third modification, when the second character string is formed of the composition all of which is difficult to be designated with the finger of the user, the user can input the instruction to delete the second character string or the instruction not to delete the second character string by the swipe operation in the upper or downward direction to the touch panel 15a. Accordingly, the convenience of the user is further improved.

Other Modifications

While the controller 10 underlines the second character string in the selection screen in the above-described embodiment to display the second character string in the display format different from those of the other character strings, the disclosure is not limited to the embodiment. For example, the second character string may be displayed in bold face, displayed in italic, or displayed in a color different from those of the other character strings to display the second character string in the display format different from those of the other character strings.

While the determination screen has the configuration including the software key to input the instruction to terminate the duplication deletion process and the software key to input the instruction to re-execute the duplication deletion process in the above-described embodiment, the disclosure is not limited to the embodiment. For example, the determination screen may include a cancel button to input the instruction to abort the duplication deletion process in addition to the above-described software keys. In this case, when the user presses the cancel button, the controller 10 deletes the first to the third document data stored in the HDD 19 and terminates the first to the third duplication deletion processes.

While the selection screen has the configuration including the software key to input the instruction to delete the second character string and the software key to input the instruction not to delete the second character string in the above-described embodiment, the disclosure is not limited to the embodiment. For example, the selection screen may include a software key to input an instruction to transition to the previous selection screen and a software key to input an instruction to transition to the next selection screen in addition to the above-described software keys. This allows the user to confirm the content of the undisplayed second character string without instructing whether to delete the second character string currently displayed in the display 16 or not.

In the second modification, while the first operation method is the swipe operation in the left direction on the touch panel and the second operation method is the swipe operation in the right direction on the touch panel, the disclosure is not limited to the embodiment. For example, the first operation method may be a flick operation in the left direction on the touch panel and the second operation method may be a flick operation in the right direction on the touch panel.

In the third modification, while the third operation method is the swipe operation in the upper direction on the touch panel and the fourth operation method is the swipe operation in the downward direction on the touch panel, the disclosure is not limited to the embodiment. For example, the third operation method may be a flick operation in the upper direction on the touch panel and the fourth operation method may be a flick operation in the downward direction on the touch panel.

The disclosure is not limited to the configuration of the embodiment and can be variously modified. For example, while the embodiment gives the description using the color multi-functional peripheral as the one embodiment of the image forming apparatus according to the disclosure, this is merely one example, and the image forming apparatus may be a monochrome multi-functional peripheral, or another type of electronic device, for example, another image forming apparatus such as a printer, a copying machine, and a facsimile device.

Exemplary Embodiment of the Disclosure

An image processing apparatus according to an aspect of the disclosure includes an image reading unit and a controller. The image reading unit reads an image on a document to create image data. The controller executes a character conversion process on the image data created by the image reading unit to extract information on a character string included in the image. The controller creates first document data corresponding to the extracted character string based on the extracted information on the character string. When the character string successively includes a first character string and at least one second character string identical to the first character string, the controller creates second document data where document data corresponding to the second character string has been deleted from the first document data using the first document data.

An image forming apparatus according to another one aspect of the disclosure includes the above-described image processing apparatus and the image forming unit that forms an image based on the first document data or an image based on the second document data on a recording sheet.

Effects of the Disclosure

The disclosure eliminates the need for the user to determine whether the document includes the duplicated character strings or not when the duplicated character string is deleted, thereby ensuring eliminating the labor of the user required to confirm the printed image.

Additionally, this eliminates the need for the user to execute a correction of deleting the document data corresponding to the duplicated character string from the document data corresponding to the character string included in the document using the computer, thereby ensuring eliminating the labor of the user required for the correction. Furthermore, even when the document data corresponding to the character string included in the document is not stored in the computer, this configuration eliminates the need for the user to create the document data again, thereby also ensuring reducing the burden on the user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
a contact glass and scanning optics for optically reading image information from a document on the contact glass to create image data;
a display, the display including a touch panel for receiving user-input instructions; and
a control unit electrically connected to the scanning optics, the touch panel, and the display, the control unit including a processor and memory storing at least first duplication-deletion process and second duplication-deletion process control programs, and a controller-control program through the execution of which the control unit functions as a controller for executing a character conversion process on the image data created by the scanning optics to extract information on any character strings included in the image data, and based on the extracted character-string information, creating first document data corresponding to any extracted character strings; wherein
the controller causes the display to display a setting screen through which either the first or the second duplication-deletion process control program is user-selected via the touch panel, and
when the first document data includes a first character string and at least one second character string in succession with and identical to the first character string,
if the first duplication-deletion process control program is user-selected, utilizing the first document data the controller automatically, without user instruction, creates second document data in which document data corresponding to the second character string has been deleted from the first document data, and
if the second duplication-deletion process control program is user-selected, utilizing the first document data the controller causes the display to display the first character string and the at least one second character string, and thereafter when an instruction to delete the at least one second character string is input to the touch panel, the controller creates second document data in which document data corresponding to the second character string has been deleted from the first document data.

2. The image processing apparatus according to claim 1, wherein the touch-panel-including display is configured such that the instruction to delete the at least one second character string is user-inputtable through an operation on the touch panel by a predetermined first operation method, and such that an instruction not to delete the at least one second character string is user-inputtable through an operation on the touch panel by a predetermined second operation method different from the first operation method.

3. The image processing apparatus according to claim 2, wherein the first operation method is a swipe operation in a first direction on the touch panel, and the second operation method is the swipe operation in a second direction different from the first direction on the touch panel.

4. The image processing apparatus according to claim 1, wherein the controller causes the display to display the second character string in a display format different from a display format of the first character string.

5. The image processing apparatus according to claim 4, wherein the display format in which the controller causes the display to display the second character string is one selected from boldface, italic, or a color different from display color of the first character string.

6. An image forming apparatus comprising:
the image processing apparatus according to claim 1, and
an image forming unit that forms an image based on the first document data or an image based on the second document data on a recording sheet.

* * * * *